US011122245B2

United States Patent
Oh

(10) Patent No.: US 11,122,245 B2
(45) Date of Patent: Sep. 14, 2021

(54) DISPLAY APPARATUS, METHOD FOR CONTROLLING THE SAME AND IMAGE PROVIDING APPARATUS

(71) Applicant: SAMSUNG ELECTRONICS CO., LTD., Suwon (KR)

(72) Inventor: Sung Bo Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/192,280

(22) Filed: Nov. 15, 2018

(65) Prior Publication Data

US 2019/0158793 A1 May 23, 2019

(30) Foreign Application Priority Data

Nov. 17, 2017 (KR) ........................ 10-2017-0154027

(51) Int. Cl.
| | |
|---|---|
| *H04N 9/68* | (2006.01) |
| *G09G 3/34* | (2006.01) |
| *G06T 11/00* | (2006.01) |
| *G09G 5/10* | (2006.01) |
| *G09G 3/20* | (2006.01) |
| *G09G 5/00* | (2006.01) |

(52) U.S. Cl.
CPC ............ *H04N 9/68* (2013.01); *G06T 11/001* (2013.01); *G09G 3/2003* (2013.01); *G09G 3/3413* (2013.01); *G09G 5/003* (2013.01); *G09G 5/10* (2013.01); *G09G 2320/0673* (2013.01); *G09G 2360/16* (2013.01)

(58) Field of Classification Search
None
See application file for complete search history.

(56) References Cited

U.S. PATENT DOCUMENTS

| | | | | |
|---|---|---|---|---|
| 5,408,267 | A | * | 4/1995 | Main ..................... H04N 5/202 327/346 |
| 10,332,483 | B1 | * | 6/2019 | Ge .......................... G09G 5/10 |
| 2006/0262363 | A1 | * | 11/2006 | Henley ................. G06T 5/009 358/516 |

(Continued)

FOREIGN PATENT DOCUMENTS

| | | |
|---|---|---|
| EP | 2 819 414 A2 | 12/2014 |
| EP | 2 819 414 A3 | 2/2015 |

(Continued)

OTHER PUBLICATIONS

International Search Report dated Mar. 27, 2019 in corresponding International Patent Application No. PCT/KR2018/014148.

(Continued)

*Primary Examiner* — Aaron M Richer
(74) *Attorney, Agent, or Firm* — Staas & Halsey LLP

(57) ABSTRACT

A display apparatus displaying, a method for controlling the display apparatus, and an image providing apparatus. The display apparatus includes a communicator configured to receive image data of an image and brightness information of the image, a processor configured to generate a tone mapping curve by using the brightness information and to apply the tone mapping curve to the image data to provide tone mapped image data, and a display configured to display the image based on the tone-mapped image data.

10 Claims, 20 Drawing Sheets

(56) References Cited

U.S. PATENT DOCUMENTS

| | | | |
|---|---|---|---|
| 2007/0291048 A1* | 12/2007 | Kerofsky | G09G 3/3406 |
| | | | 345/589 |
| 2011/0292246 A1* | 12/2011 | Brunner | G06T 5/009 |
| | | | 348/231.99 |
| 2012/0256943 A1 | 10/2012 | Atkins et al. | |
| 2013/0278830 A1* | 10/2013 | Noutoshi | H04N 5/21 |
| | | | 348/607 |
| 2015/0358646 A1* | 12/2015 | Mertens | H04N 1/6058 |
| | | | 382/166 |
| 2016/0117975 A1 | 4/2016 | Kang | |
| 2017/0052973 A1* | 2/2017 | Wang | G06F 16/1727 |
| 2017/0256039 A1 | 9/2017 | Hsu et al. | |
| 2017/0272690 A1* | 9/2017 | Seifi | H04N 5/355 |
| 2018/0139429 A1* | 5/2018 | Park | G09G 5/10 |
| 2019/0005898 A1* | 1/2019 | Albrecht | G06F 1/1643 |

FOREIGN PATENT DOCUMENTS

| | | | |
|---|---|---|---|
| EP | 3 096 287 | 11/2016 | |
| EP | 3 136 375 A1 | 3/2017 | |
| EP | 3 163 890 A1 | 5/2017 | |
| EP | 3 168 809 | 5/2017 | |
| WO | WO 2015/073377 A1 | 5/2015 | |
| WO | WO-2016182307 A1 * | 11/2016 | G06T 5/008 |

OTHER PUBLICATIONS

Extended European Search Report dated Jul. 27, 2020, in corresponding European Patent Application No. 18877802.1.
Communication pursuant to Article 94(3) EPC dated Mar. 10, 2021, in corresponding European Patent Application No. 18 877 802.1.
Chinese Office Action dated May 31, 2021, in corresponding Chinese Patent Application No. 201880074340.5.

* cited by examiner

FIG. 5

| Byte/B # | 7 | 6 | 5 | 4 | 3 | 2 | 1 | 0 |
|---|---|---|---|---|---|---|---|---|
| HB0 | 1 | \multicolumn{7}{c}{VSif type code = 1(0x01)} | | | | | | | |
| HB1 | \multicolumn{8}{c}{VSif version = 1(0x01)} | | | | | | | | |
| HB2 | 0 | 0 | 0 | \multicolumn{5}{c}{Length = 27(0x1B)} | | | | | |
| PB00 | \multicolumn{8}{c}{Checksum} | | | | | | | | |
| PB01 | \multicolumn{8}{c}{IEEE OUI, Thir Octet = (0xd2)} | | | | | | | | |
| PB02 | \multicolumn{8}{c}{IEEE OUI, Second Octet = (0x5d)} | | | | | | | | |
| PB03 | \multicolumn{8}{c}{IEEE OUI, First Octet = (0xc4)} | | | | | | | | |
| PB04 | \multicolumn{8}{c}{Reserved} | | | | | | | | |
| PB05 | | | | | | | | |
| PB06 | \multicolumn{8}{c}{distribution maxrgb percentiles[w][0] = 1%} | | | | | | | | |
| PB07 | | | | | | | | |
| PB08 | \multicolumn{8}{c}{distribution maxrgb percentiles[w][1] = 5%} | | | | | | | | |
| PB09 | | | | | | | | |
| PB10 | \multicolumn{8}{c}{distribution maxrgb percentiles[w][2] = 10%} | | | | | | | | |
| PB11 | | | | | | | | |
| PB12 | \multicolumn{8}{c}{distribution maxrgb percentiles[w][3] = 25%} | | | | | | | | |
| PB13 | | | | | | | | |
| PB14 | \multicolumn{8}{c}{distribution maxrgb percentiles[w][4] = 50%} | | | | | | | | |
| PB15 | | | | | | | | |
| PB16 | \multicolumn{8}{c}{distribution maxrgb percentiles[w][5] = 75%} | | | | | | | | |
| PB17 | | | | | | | | |
| PB18 | \multicolumn{8}{c}{distribution maxrgb percentiles[w][6] = 90%} | | | | | | | | |
| PB19 | | | | | | | | |
| PB20 | \multicolumn{8}{c}{distribution maxrgb percentiles[w][7] = 95%} | | | | | | | | |
| PB21 | | | | | | | | |
| PB22 | \multicolumn{8}{c}{distribution maxrgb percentiles[w][8] = 98%} | | | | | | | | |
| PB23 | | | | | | | | |
| PB24 | \multicolumn{8}{c}{distribution maxrgb percentiles[w][9] = 99%} | | | | | | | | |
| PB25 | | | | | | | | |
| PB26 | \multicolumn{8}{c}{Reserved + Overlay Flag On/Off = 0x0} | | | | | | | | |
| PB27 | | | | | | | | |

| Byte | bit | | | | | | | |
|------|---|---|---|---|---|---|---|---|
| | 7 | 6 | 5 | 4 | 3 | 2 | 1 | 0 |
| HB0 | 1 | VSIF type code = 1(0x01) | | | | | | |
| HB1 | VSIF version (=0x01) | | | | | | | |
| HB2 | 0 | 0 | 0 | Length (max27) | | | | |
| PB00 | Checksum | | | | | | | |
| PB01 | 0x8B | IEEE 24bit code | | | | | | |
| PB02 | 0x84 | (least significant byte first) | | | | | | |
| PB03 | 0x90 | | | | | | | |
| PB04 | application version[1...0] | | targeted system display maximum luminance[4...0] | | | | | reserved |
| PB05 | average maxrgb[7...0] | | | | | | | |
| PB06 | distribution_maxrgb_percentiles[0] [@1%] [7...0] | | | | | | | |
| PB07 | distribution_maxrgb_percentiles[1] (DistributionY100)[7...0] | | | | | | | |
| PB08 | distribution_maxrgb_percentiles[2] (DistributionY100nit)[7...0] | | | | | | | |
| PB09 | distribution_maxrgb_percentiles[3] [@25%] [7...0] | | | | | | | |
| PB10 | distribution_maxrgb_percentiles[4] [@50%] [7...0] | | | | | | | |
| PB11 | distribution_maxrgb_percentiles[5] [@75%] [7...0] | | | | | | | |
| PB12 | distribution_maxrgb_percentiles[6] [@90%] [7...0] | | | | | | | |
| PB13 | distribution_maxrgb_percentiles[7] [@95%] [7...0] | | | | | | | |
| PB14 | distribution_maxrgb_percentiles[8] [@99.98%] [7...0] | | | | | | | |
| PB15 | num bezier_curve_anchors[3...0] | | | | knee point x [9...6] | | | |
| PB16 | knee point x [5...0] | | | | | | knee point y [9...8] | |
| PB17 | knee point y [7...0] | | | | | | | |
| PB18 | bezier_curve_anchors [1] [7...0] | | | | | | | |
| PB19 | bezier_curve_anchors [2] [7...0] | | | | | | | |
| PB20 | bezier_curve_anchors [3] [7...0] | | | | | | | |
| PB21 | bezier_curve_anchors [4] [7...0] | | | | | | | |
| PB22 | bezier_curve_anchors [5] [7...0] | | | | | | | |
| PB23 | bezier_curve_anchors [6] [7...0] | | | | | | | |
| PB24 | bezier_curve_anchors [7] [7...0] | | | | | | | |
| PB25 | bezier_curve_anchors [8] [7...0] | | | | | | | |
| PB26 | bezier_curve_anchors [9] [7...0] | | | | | | | |
| PB27 | graphics overlay flag | | | | reserved [6...0] | | | |

DISPLAY APPARATUS, METHOD FOR CONTROLLING THE SAME AND IMAGE PROVIDING APPARATUS

CROSS-REFERENCE TO RELATED APPLICATION(S)

This application is based on and claims priority under 35 U.S.C. § 119 to Korean Patent Application No. 10-2017-0154027, filed on Nov. 17, 2017, in the Korean Intellectual Property Office, the disclosure of which is incorporated by reference herein in its entirety

BACKGROUND

1. Field

Embodiments of the present disclosure relate to a display apparatus displaying, a method for controlling the same, and an image providing apparatus.

2. Description of Related Art

A display apparatus represents an apparatus that is capable of converting image data, which is stored therein and/or transmitted from the outside, into visual information so as to output the visual information in the form of screen. The display apparatus may include an electronic board, a digital television, a monitor device, a smart phone, a tablet PC, a navigation device, an electronic billboard or a variety of other devices capable of displaying images. The display apparatus may be used for various purposes in various places such as a house or a business place.

The display apparatus may output an image to the outside using various displays. The displays may include a cathode ray tube (CRT), a liquid crystal display (LCD), a light emitting diode (LED), an organic light emitting diode (OLED), an active organic light emitting diode or electronic paper.

SUMMARY

Therefore, it is an aspect of the present disclosure to provide a display apparatus capable of directly generating a tone mapping function applied to an image to be displayed thereon, a method for controlling the display apparatus, and an image providing apparatus.

Additional aspects of the present disclosure will be set forth in part in the description which follows and, in part, will be obvious from the description, or may be learned by practice of the present disclosure.

In accordance with an aspect of the disclosure, a display apparatus includes a communicator configured to receive an image and information on brightness of the image, a processor configured to acquire a tone mapping curve by using the brightness information and apply the tone mapping curve to the image, and a display configured to display an image to which the tone mapping curve is applied.

The processor may generate the tone mapping curve based on the maximum brightness of the display and acquire the tone mapping curve.

The brightness information may include percentile information of brightness distribution of the image.

The brightness distribution of the image may include a histogram that is acquired by accumulating the maximum value among R value, G value and B value of each pixel of the image.

The communicator may further receive information on a reference tone mapping curve. The processor may generate the tone mapping curve by further using the reference tone mapping curve.

The processor may generate the tone mapping curve by comparing the maximum brightness of the display with the maximum brightness corresponding to the reference tone mapping curve.

The processor may select the reference tone mapping curve as the tone mapping curve when the maximum brightness of the display is the same as the maximum brightness corresponding to the reference tone mapping curve, and the processor may generate a tone mapping curve by using at least one of the brightness information and the reference tone mapping curve, and acquire the tone mapping curve, when the maximum brightness of the display is different from the maximum brightness corresponding to the reference tone mapping curve.

The processor may generate the tone mapping curve by increasing a distance between the origin and a knee point when the maximum brightness of the display is greater than the maximum brightness corresponding to the reference tone mapping curve, and the processor may generate the tone mapping curve by reducing a distance between the origin and the knee point when the maximum brightness of the display is less than the maximum brightness corresponding to the reference tone mapping curve.

The communicator may receive the image and the brightness information by using High Definition Multimedia Interface (HDMI) standard.

In accordance with another aspect of the disclosure, an image providing apparatus includes a content obtainer configured to acquire an image file, a processor configured to decode the acquired image file and acquire at least one of information on brightness of an image and a reference tone mapping curve from the decoded image information, and a communicator configured to transmit at least one of the acquired brightness information of the image and the reference tone mapping curve, to a display apparatus.

In accordance with another aspect of the disclosure, a method for controlling a display apparatus includes receiving an image and information on brightness of the image, acquiring a tone mapping curve by using the brightness information, applying the tone mapping curve to the image, and displaying the image to which the tone mapping curve is applied.

The acquiring of the tone mapping curve by using the brightness information may include generating the tone mapping curve based on the maximum brightness of a display, and acquiring the tone mapping curve.

The brightness information may include percentile information of brightness distribution of the image.

The brightness distribution of the image may be acquired by accumulating the maximum value among R value, G value and B value of each pixel of the image.

The reception of the image and information on brightness of the image may include receiving the image, information on brightness of the image, and information on a reference tone mapping curve, and the acquiring of the tone mapping curve by using the brightness information may include generating the tone mapping curve by using the brightness information and the reference tone mapping curve.

The generation of the tone mapping curve by using the brightness information and the reference tone mapping curve may include comparing the maximum brightness of the display with the maximum brightness corresponding to the reference tone mapping curve.

The generation of the tone mapping curve by using the brightness information and the reference tone mapping curve may include at least one of selecting the reference tone mapping curve as the tone mapping curve when the maximum brightness of the display is the same as the maximum brightness corresponding to the reference tone mapping curve; and generating a tone mapping curve by using at least one of the brightness information and the reference tone mapping curve and acquiring the tone mapping curve, when the maximum brightness of the display is different from the maximum brightness corresponding to the reference tone mapping curve.

The generation of the tone mapping curve by using at least one of the brightness information and the reference tone mapping curve and acquiring the tone mapping curve, when the maximum brightness of the display is different from the maximum brightness corresponding to the reference tone mapping curve, may include at least one of generating the tone mapping curve by increasing a distance between the origin and a knee point when the maximum brightness of the display is greater than the maximum brightness corresponding to the reference tone mapping curve, and generating the tone mapping curve by reducing a distance between the origin and the knee point when the maximum brightness of the display is less than the maximum brightness corresponding to the reference tone mapping curve.

The reception of the image and information on brightness of the image may include receiving the image and the brightness information by using High Definition Multimedia Interface (HDMI) standard.

BRIEF DESCRIPTION OF THE DRAWINGS

These and/or other aspects of the disclosure will become apparent and more readily appreciated from the following description of embodiments, taken in conjunction with the accompanying drawings of which:

FIG. 5 is a view illustrating a part of a transmission format that is received from an image producer terminal apparatus by the display apparatus;

FIG. 13 is a view illustrating a part of a transmission format transmitted from the image providing apparatus to the display apparatus;

DETAILED DESCRIPTION

Figure 1:
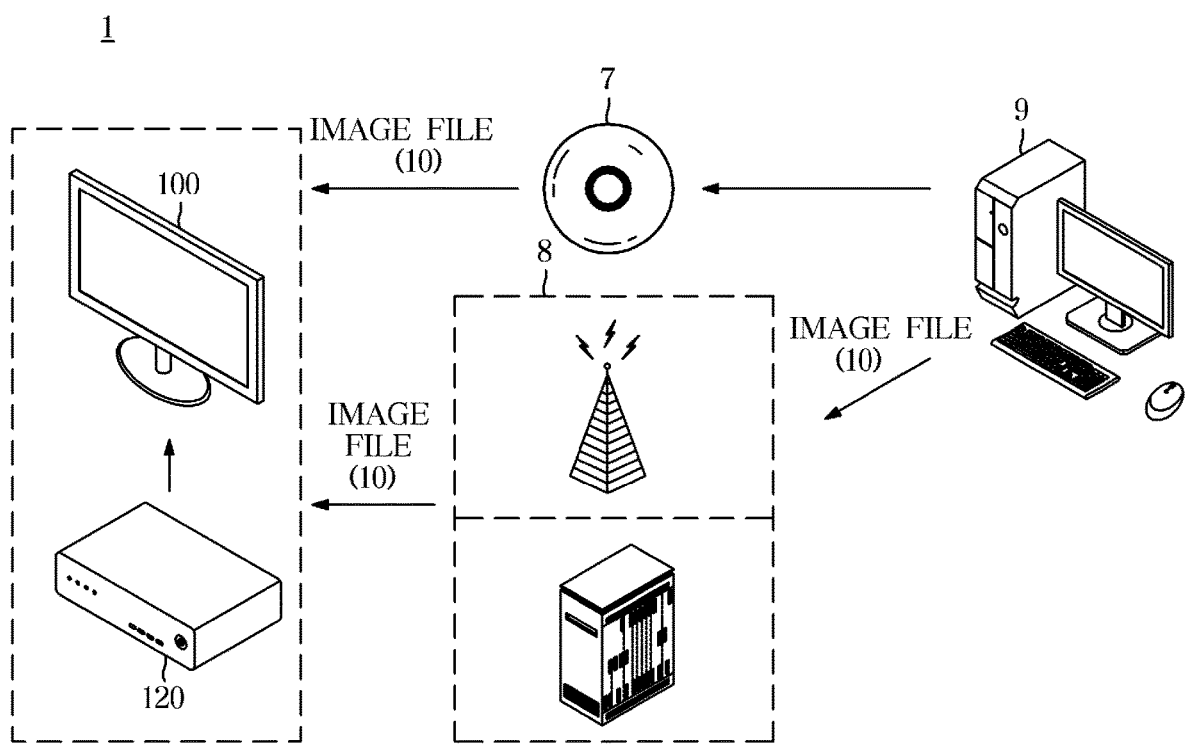
FIG. 1 is a schematic diagram of an image providing system according to an embodiment.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

Reference will now be made in detail to embodiments of the present disclosure, examples of which are illustrated in the accompanying drawings.

FIG. 1 is a schematic diagram of an image providing system according to an embodiment.

As illustrated in FIG. 1, according to an embodiment, in order to provide an image to a display apparatus 100, an image providing system 1 may include the display apparatus 100, an image producer terminal apparatus 9 configured to produce an image file 10 related to an image to be displayed on the display apparatus 100, and a storage medium 7 or a transmitter 8 configured to directly or indirectly transmit the image file 10 produced by the image producer terminal apparatus 9.

The display apparatus 100 and an image providing apparatus 120 may directly receive video or audio data from the storage medium 7 having the image file 10.

In addition, the display apparatus 100, the image producer terminal apparatus 9, and the transmitter 8 may be configured to transmit data (e.g., the image file 10) to at least one direction via a wired communication network, a wireless communication network or a network that is established by combining the wired communication network and the wireless communication network. The wired communication network may be constructed using a cable. For example, the cable may be implemented using a pair cable, a coaxial cable, a fiber optic cable, or an Ethernet cable. The wireless communication network may include at least one of a local area network and a telecommunications network. For example, local area network may be implemented by Wi-Fi, Bluetooth, Wi-Fi Direct, Bluetooth Low Energy, CAN communication, Zigbee and/or Near Field Communication (NFC). The telecommunication network may be implemented based on a mobile communication standard such as 3GPP, 3GPP2 or WiMAX series.

The display apparatus 100 may represent a device configured to display an image. The display apparatus 100 may acquire image data 11 from the image file 10 and visually display the acquired image on a screen. According to embodiments, the display apparatus 100 may acquire metadata 12 from the image file 10 and perform certain image processing on the image data 11 by using the metadata 12 and then visually display the image, on which the image processing is performed, on a screen.

Particularly, the display apparatus 100 may acquire the metadata 12 of the image file 10 from the storage medium 7 such as an optical disc and perform the image processing on the image data 11 by using the metadata. The optical disc may be a UHD BD disc, but is not limited thereto.

The display apparatus 100 may receive the image file 10 from the image providing apparatus 120. That is, the display apparatus 100 may acquire the metadata 12 from the image file 10 received by the image providing apparatus 120 via the storage medium 7, and perform the image processing of the image data 11 by using the metadata.

The display apparatus 100 may receive the image file 10 via the external wired and/or wireless communication network, and/or receive the image file 10 from an external storage medium (not shown) and/or the image providing apparatus 120 connected through various terminals such as universal serial bus (USB) terminals, and High-definition multimedia interface (HDMI), provided in the display apparatus 100, or various cables using a standard such as IEEE 1394.

The display apparatus 100 may include a digital TV, a monitor device connected to a desktop computer (including a case in which a television reception card is mounted), a laptop computer, a smart phone, a tablet PC, a navigation device, an electronic billboard, an electronic blackboard, a projector, a portable game machine, a smart watch, a head mounted display (HMD) and/or various devices capable of outputting images.

The image producer terminal apparatus 9 may receive, select and/or generate the image file 10 for reproducing an image. The image producer terminal apparatus 9 may include a desktop computer, a laptop computer, a smartphone, a tablet PC and/or a linear editing system or a non-linear editing system which are specifically designed for image production. In addition, various devices capable of producing and editing an image may be employed as the image producer terminal apparatus 9.

The image file 10 may be produced by being converted using a certain codec. The certain codec may include H.26x codec (e.g., H.262 (MPEG2), H.263 (MPEG4), H.264 (AVC) and/or H.265 (HEVC)), WMV codec, WebM/VP9 codec, Intel, Indeo, CinePak, ProRes or DNxHD codec. The image file 10 may be produced by being compressed by a coder provided in the image producer terminal apparatus 9, based on the above mentioned codec.

The image file 10 may include the image data 11 (refer to FIG. 2) for reproducing an image and the metadata 12 (refer to FIG. 2) added to the image data 11.

The image data 11 may represent data about an image itself to be reproduced. For example, the image data 11 may include information on a plurality of image frames. The image data 11 may include a predetermined number of image frames per second (for example, 24 or 30) according to the format of the image file 10 or a reproduction method of the display apparatus 100. The image may be formed by at least one scene. At least one scene may be achieved by at least one cut formed by a set of image frames. The image data 11 may be recorded in a body portion of the image file 10 to be transmitted.

The metadata 12 may include various kinds of information related to the image data 11. For example, the metadata 12 may include at least one piece of information on identification of the image data 11, information on content of the image data 11, information on the copyright of the image data 11, information on a reconstruction method of the image data 11, information on search of the image data 11 and/or electronic program guide (EPG). The metadata 12 may be typically recorded in a header portion of the image file 10 to be transmitted but is not limited thereto.

The image file 10 may be transmitted to the display apparatus 100 via a wire/wireless communication network. The image file 10 may be transmitted to the display apparatus 100 and/or the image providing apparatus 120 by the transmitter 8.

Alternatively, the image file 10 may be transmitted to the display apparatus 100 such that the image file 10 is recorded on a recording medium, which is readable by a computer, and then the recording medium is directly mounted to the display apparatus 100. In addition, the image file 10 may be transmitted to the display apparatus 100 such that the image file 10 is recorded on a recording medium and the recording medium is mounted to a separate reproduction device and then the image file 10 is transmitted to the display apparatus 100 by an operation of the reproduction device. Recording medium readable by a computer may include a magnetic disk storage medium, a magnetic tape, an optical recording medium, and a semiconductor storage device. Particularly, the image file 10 may be recorded in a recording medium such as a DVD or Blu-ray disc, and the reproduction device configured to play a DVD or blu-ray disc may analyze and transmit the image file 10 recorded on the recording medium, and/or transmit the image file 10 to the display apparatus 100 without an additional process. Therefore, the display apparatus 100 may display an image corresponding to the image data 11 and/or the metadata 12, on the screen.

A structure and operation of the display apparatus 100 and the metadata 12 will be described later in details.

The transmitter 8 may transmit the image file 10 having the image data 11 for reproducing an image and the metadata 12 added to the image data 11, to the display apparatus 100.

The transmitter 8 may transmit the image data 11 for reproducing an image and the metadata 12 added to the image data 11, to the image providing apparatus 120. In this case, the transmitter 8 may receive the image data 11 for reproducing an image and the metadata 12 added to the image data 11, from the image producer terminal apparatus 9 through the wired and/or wireless communication network. For example, the transmitter 8 may be implemented by broadcasting transmission equipment used for various public broadcasting or cable broadcasting and/or a computer apparatus (server) for providing streaming service or a video-on-demand service.

Depending on embodiments, the transmitter 8 may be omitted. In this case, the image file 10 may be transmitted from the image producer terminal apparatus 9 to the display apparatus 100 or to the image providing apparatus 120 via the storage medium 7.

The image providing apparatus 120 may represent an apparatus configured to receive the image file 10 and acquire data needed for reproducing an image from the received image file 10, and then provide the data to the display apparatus 100.

The image providing apparatus 120 may acquire the image data 11 and/or the metadata 12 from the image file 10, which is stored in the certain recording medium such as DVD or blu-ray disc, and/or which is received from the storage medium 7 or the transmitter 8, and transmit the acquired image data 11 and/or metadata 12 to the display apparatus 100. As needed, the image providing apparatus 120 may further perform a certain image processing on the acquired image data 11.

The image providing apparatus 120 may be implemented by a DVD player, a Blu-ray player, a game console, a set-top box and/or a television receiving card. In addition, the image providing apparatus 120 may be implemented by a variety of apparatuses that acquire the image file 10, and transmit the image file 10 to the display apparatus 100 with performing a certain process on the image file 10 or without performing the certain process.

Hereinafter an operation of the display apparatus 100 will be described in more detail.

Figure 2:
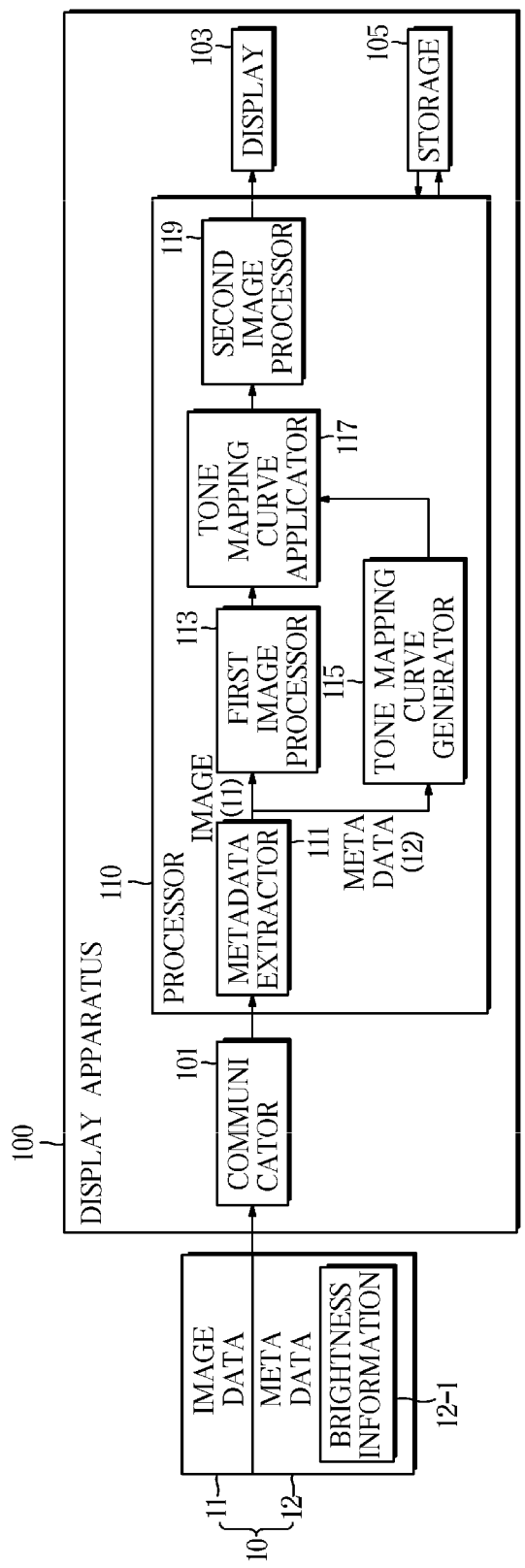
FIG. 2 is a block diagram of a display apparatus according to an embodiment.

FIG. 2 is a block diagram of a display apparatus according to an embodiment.

Referring to FIG. 2, according to an embodiment, the display apparatus 100 may include a communicator 101 receiving the image file 10, a processor 110 performing an image processing on the received image file 10, a display 103 displaying an image, and a storage 105 storing a variety of information required for an operation of the processor 110.

The communicator 101 may be communicably connected to at least one of the image producer terminal apparatus 9, the transmitter 8 and the image providing apparatus 120 to receive the image file 10 and transmit the received image file 10 to the processor 110. For example, the communicator 101 may include a terminal and related components connected to the wired communication network or an antenna, a communication chip and related components connected to the wireless communication network.

The communicator 101 may receive the image file 10 by using a coax cable, a digital visual interface (DVI), a high-definition multimedia interface (HDMI) standard or a thunderbolt, but is not limited thereto.

According to embodiments, the communicator 101 may further receive audio data. As needed, audio data may be added to the image file 10 and then transmitted.

According to embodiments, the communicator 101 may transmit or provide information related to whether the display apparatus 100 is capable of performing a certain function or not, to at least one of the image producer terminal apparatus 9, the transmitter 8 and the image providing apparatus 120.

For example, the communicator 101 may transmit information related to whether the display apparatus 100 supports high dynamic range (HDR) or not, to at least one of the above mentioned apparatuses 8, 9 and 120.

For another example, the communicator 101 may communicate with at least one of the above mentioned apparatuses 8, 9 and 120 and provide data to allow the display apparatus 100 to display information related whether the display apparatus 100 is capable of performing a certain function, by assigning a certain region of enhance display identification data (EDID).

Accordingly, at least one of the above mentioned apparatuses 8, 9 and 120 may identify whether the display apparatus 100 is capable of a function of high dynamic range and select whether to transmit certain metadata 12 such as information on brightness 12-1 or information on a reference tone mapping curve, based on a result of identification.

The processor 110 may acquire the image data 11 based on the image file 10 transmitted from the communicator 101, and perform a certain image processing on the image data 11 by using the metadata 12, thereby allowing the display 103 to output (display) the image on which the image processing is performed, to the outside.

The processor 110 may include a central processing unit (CPU), a microcontroller unit (MCU), a micro-processor (Micom), an applications processor (AP), an electronic controlling unit (ECU) and/or other electronics capable of various kinds of arithmetic processing and generating control signals. These devices may be implemented using one or more semiconductor chips and associated components.

Referring to FIG. 2, according to an embodiment, the processor 110 may include a metadata extractor 111 obtaining the metadata 12 from the image file 10, a first image processor 113 performing a certain image processing on the image data 11, a tone mapping curve generator 115 generating a tone mapping curve 20 (refer to FIG. 6) about the image data 11 based on the metadata 12, a tone mapping curve applicator 117 applying the tone mapping curve 20 to the image data 11, and a second image processor 119 performing an additional image processing as needed. At least one of the above mentioned components 113 to 119 may be omitted. For example, at least one between the first image processor 113 and the second image processor 119 may be omitted. FIG. 2 illustrates that the metadata extractor 111, the first image processor 113, the tone mapping curve generator 115, the tone mapping curve applicator 117 and the second image processor 119 are separated from each other, which is for convenience of description. Therefore, it should be understood that the above mentioned components 111 to 117 is not physically separated from each other, and thus at least one of the above mentioned components 111 to 117 may be physically or logically separated from each other, depending on embodiments.

The metadata extractor 111 may receive the image file 10 from the communicator 101 and then acquire the metadata 12 from the image file 10 and then transmit the acquired metadata 12 to the tone mapping curve generator 115. Depending on embodiments, the metadata extractor 111 may transmit the image file 10 or the image data 11, which is acquired from the image file 10, to at least one of the first image processor 113, the tone mapping curve applicator 117 and the second image processor 119.

According to an embodiment, the metadata 12 acquired by the metadata extractor 111 may include information on brightness 12-1. The information 12-1 on brightness may include information indicating brightness of an image to be processed and/or to be reproduced.

Figure 3:
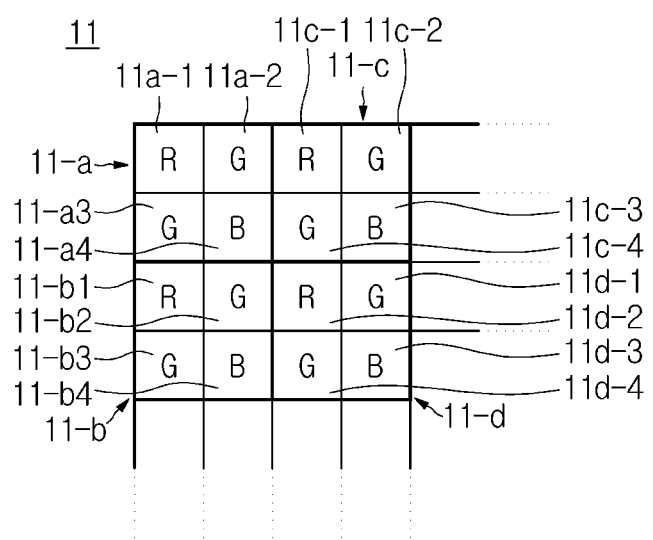
FIG. 3 is a first view illustrating information on brightness of an image.
Figure 4:
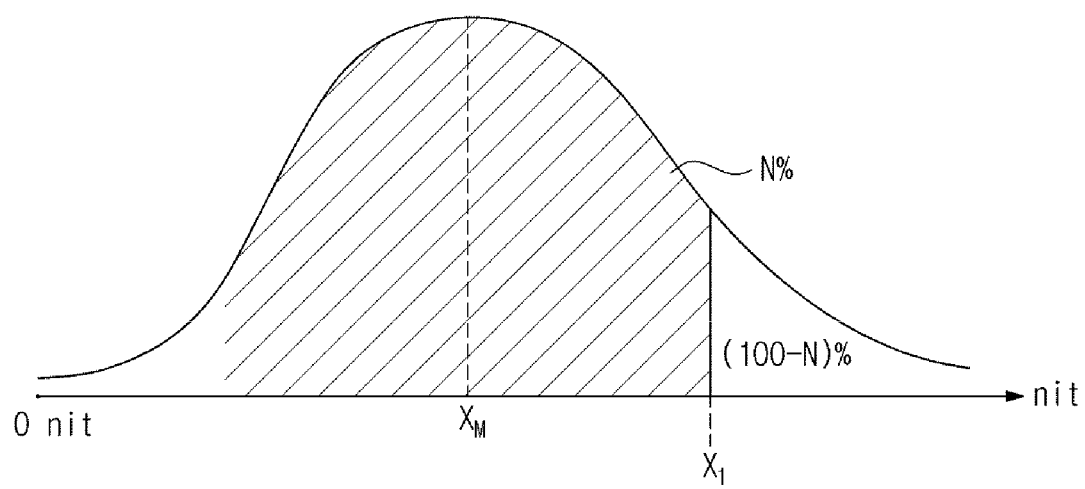
FIG. 4 is a second view illustrating information on brightness of an image.

FIG. 3 is a first view illustrating information on brightness of an image and FIG. 4 is a second view illustrating information on brightness of an image. In FIG. 4, the x-axis represents brightness and the y-axis represents a detection frequency of a value corresponding to a specific brightness detected from each pixel 11-a to 11-d.

Referring to FIG. 3, the image data 11 may include a plurality of pixels 11-a to 11-d. The plurality of pixels 11-a to 11-d represents a minimum unit forming an image. The plurality of pixels 11-a to 11-d may include a plurality of sub-pixels 11-a1 to 11-d4 so that each pixel 11-a to 11-d can express a specific color. For example, any one pixel such as a first pixel 11-a may include a plurality of sub-pixels 11-a1 to 11-a4. The sub-pixels 11-a1 to 11-a4 may emit or not emit light in a certain color such as red color R, green color G and blue color B, to allow the first pixel 11-a to emit light in a certain color. FIG. 3 illustrates that each pixel 11a to 11d includes four sub pixels 11-a1 to 11d4 having a sub pixel emitting red light, two sub pixels emitting green color, and a sub pixel emitting blue light, but the number of the sub pixels 11-a1 to 11-d4, the kinds of color and/or the arrangement pattern of the color is not limited to FIG. 3. For example, six sub pixels or more may be contained in a single pixel 11a to 11d or the sub pixels 11-a1 to 11-d4 may be configured such that one of the sub pixels 11-a1 to 11-d4 emits white light.

The brightness information 12-1 may be obtained by using values of the sub-pixels 11-a1 to 11-d4 contained in each of the pixels 11-a to 11-d. Particularly, for each of the pixels 11-a to 11-d, it is possible to obtain the greatest brightness among the sub-pixels 11-a1 to 11-d4 contained in each of the pixels 11-a to 11-d. When the greatest values of the brightness is accumulated, it is possible obtain a histogram or a graph 13 (hereinafter referred to as "histogram") similar with the histogram, as illustrated in FIG. 4. In this case, a value xm corresponding to the most frequently obtained brightness is relatively high in the histogram 13 and a value corresponding to the rarely obtained brightness is relatively low in the histogram 13.

The brightness information 12-1 may be defined using the histogram 13 acquired in this manner. For example, the brightness information 12-1 may include percentile information based on the histogram 13. The percentile information represents that a specific value is how far from a reference value when the total data is 100. That is, the percentile information may be defined as the point at which a particular value is located relative to the whole. For example, percentile information (it may be referred to as Max RGB N % percentile information) of a specific value N % ile may be defined as a specific value x1 on the X-axis of the histogram 13 that is to allow a ratio between an entire area of the histogram 13 and an area from the origin 0 to have a ratio N % corresponding to a specific value N % ile. For example, percentile information of 50% ile may be defined as a value corresponding to a position of 50% from a reference value (e.g., 0 (zero)) among all values of the histogram 13, and percentile information of 99% ile may be defined as a value corresponding to a position of 99% from a reference value in the histogram 13.

The brightness information 12-1 may include a plurality of percentiles information. For example, the plurality of percentiles information may include percentile(s) in which a specific value N % ile is defined as at least one of 1% ile, 5% ile, 10% ile, 25% ile, 50% ile, 75% ile, 90% ile, 95% ile, 98% ile and 99% ile. In other words, the brightness information 12-1 may include percentiles information corresponding to at least one of 1% ile, 5% ile, 10% ile, 25% ile, 50% ile, 75% ile, 90% ile, 95% ile, 98% ile and 99% ile, but is not limited thereto. A specific value N % ile of the plurality of percentiles information may be defined as more or less than the above mentioned value. In addition, a specific value N % ile of the plurality of percentiles information may be defined partially differently or all differently from the above mentioned value.

The brightness information 12-1 may be defined for each frame or each cut in the image data 11 or defined for each scene. In other words, the plurality of brightness information 12-1 may be defined by corresponding to each of a plurality of parts of a single image data 11.

Alternatively, the brightness information 12-1 may be defined for the entire image. That is, the brightness information 12-1 may be defined for entire of one image data 11. The brightness information 12-1 defined for each parts of the image data 11 may be used for performing dynamic tone mapping and the brightness information 12-1 defined for the entire image may be used for performing static tone mapping.

FIG. 5 is a view illustrating a part of a transmission format that is received from an image producer terminal apparatus by the display apparatus.

Particularly, FIG. 5 illustrates Vendor Specific InfoFrame (VSIF) transmission format. By using H.265 (HEVC) codec, a compressed image is decoded and thus a compression thereof is released to acquire an audio/video signal. Metadata is acquired from Supplemental Enhancement Information (SEI), and the audio/video signal is transmitted to the display apparatus 100 via HDMI from the image producer terminal apparatus 9 and metadata information is transmitted. In this process, Vendor Specific InfoFrame (VSIF) transmission format is transmitted in a state in which the image producer terminal apparatus 9 is connected to HDMI to transmit the metadata The brightness information 12-1 may be contained in SEI of the metadata 12. The image producer terminal apparatus 9 may acquire the brightness information 12-1 from the metadata 12 and the image producer terminal apparatus 9 may add the brightness information 12-1 to the VSIF transmission format 12-2 and then transmit the VSIF transmission format 12-2 having the brightness information 12-1 to the display apparatus 100, as illustrated in FIG. 5.

Referring to FIG. 5, the brightness information 12-1 may be transmitted after being contained in other areas 12b to 12k other than an area 12a in which the VSIF type code or length is stored.

The brightness information 12-1 may include a plurality of different percentile information such as information about each of 1% ile, 5% ile, 10% ile, 25% ile, 50% ile, 75% ile, 90% ile, 95% ile, 98% ile and 99% ile.

Meanwhile, the disclosed brightness information 12-1 is not limited to the VSIF format that is formed as HDMI by using the ST.2094-40 standard. Alternatively, the brightness information may be transmitted to the display apparatus 100 by being contained in information that is assigned to a certain area of optical disc standard format such as playlist by referring to an optical disc standard such as UHD BD disc or a BD disc.

Referring again to FIG. 2, the first image processor 113 may convert the image data 11 to allow the processor 110 to apply a tone mapping curve to the image data 11. Particularly, the first image processor 113 may acquire data in a certain form, to which the tone mapping curve is applicable, by converting a transfer function (e.g., Electrical-Optical Transfer Function (EOTF)) according to a certain standard (e.g., ST 2084 standard). For example, the transfer function may be gamma (i.e., brightness correction value) applied to the image data 11, and in this case, the first image processor 113 may release gamma from the image data 11 and convert the image data 11 into a form (e.g., a linear image data) to which an opto-optical Transfer function (OOTF) is applicable. The image data, which is acquired by the processing of the first image processor 113, may be transmitted to the tone mapping curve applicator 117.

The tone mapping curve generator 115 may generate a tone mapping curve based on the brightness information 12-1 of the metadata 12.

Figure 6:
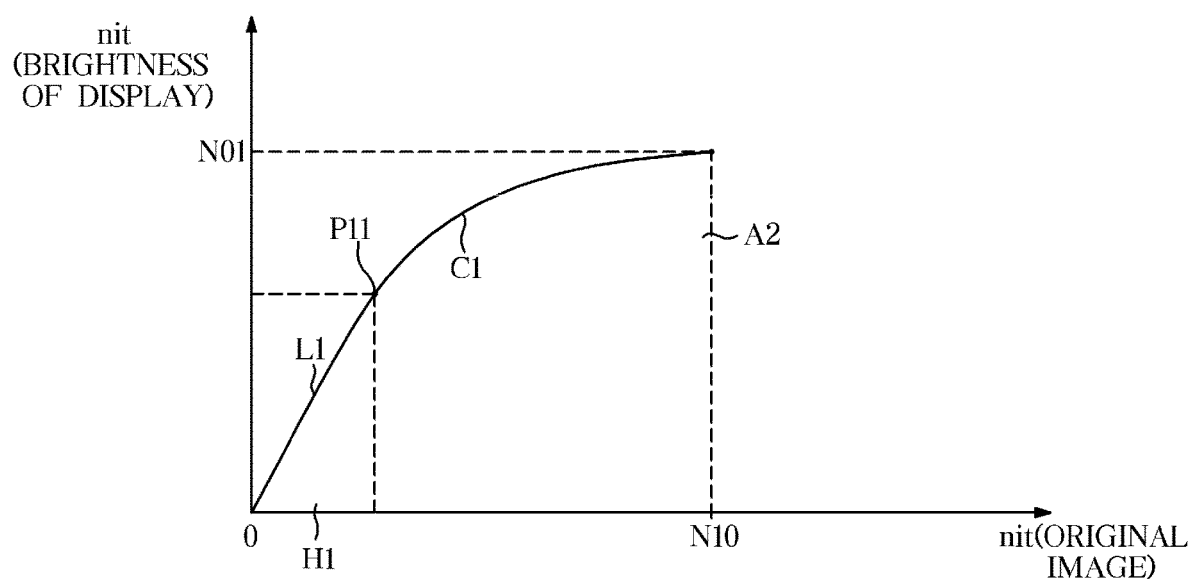
FIG. 6 is a view of an embodiment of a tone mapping curve.
Figure 7:
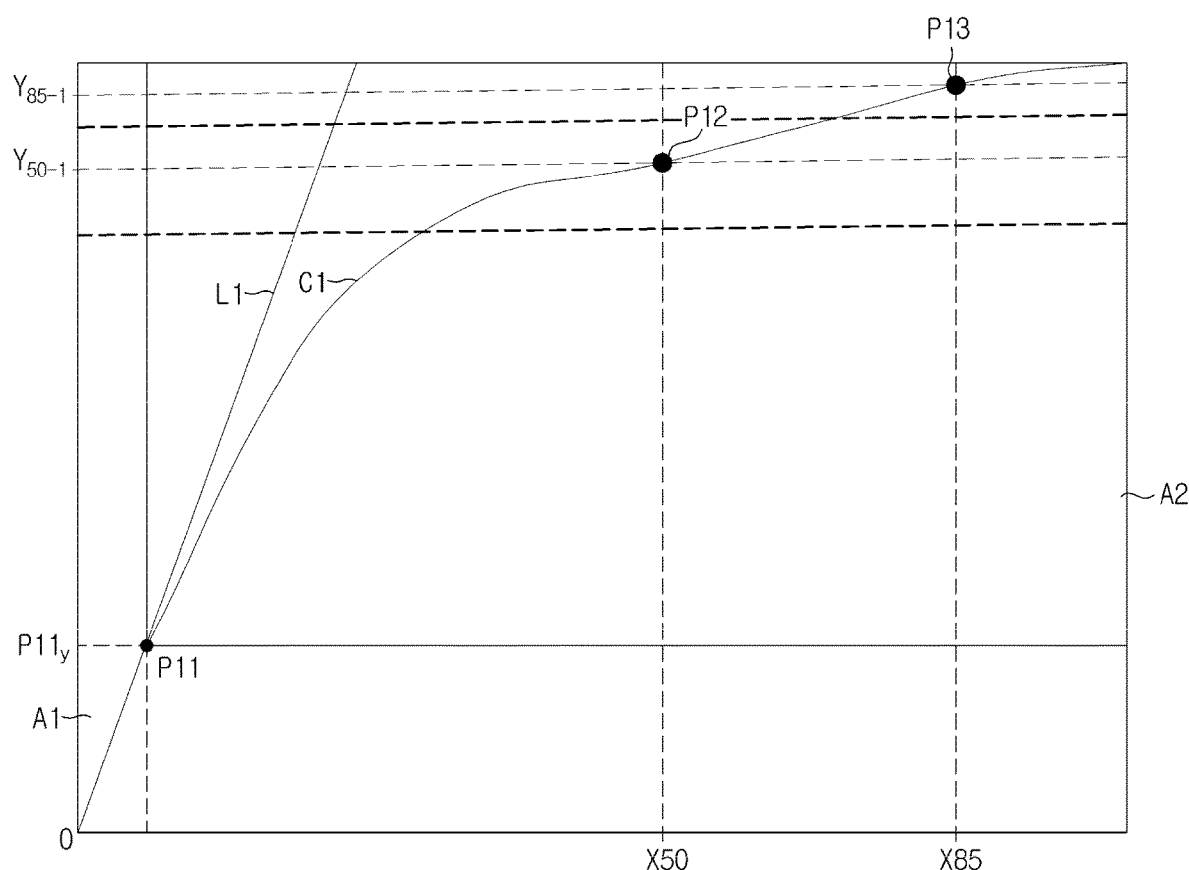
FIG. 7 is a view illustrating an example in which the display apparatus generates a tone mapping curve.

FIG. 6 is a view of an embodiment of a tone mapping curve and FIG. 7 is a view illustrating an example in which the display apparatus generates a tone mapping curve. In FIGS. 6 and 7, the x axis represents brightness of an input image (original image), and the y axis represents brightness of a display image (output image).

When the display apparatus 100 is capable of displaying the image with brightness that is relatively lower or higher than the certain brightness of the image data 11 although the image data 11 has certain brightness as whole or for each cut or scene, the display apparatus 100 may perform the tone mapping process to correct difference brightness between the input image and the output image. For example, when the brightness of the image data 11 is 1000 nit but the maximum brightness of the display apparatus 100 is 500 nit, the display apparatus 100 may not output the image data 11 with the proper brightness and thus the display apparatus 100 may convert the brightness of the image data 11 by performing a tone mapping process by using a certain conversion. A conversion (function) used for the tone mapping process is a tone mapping curve.

A tone mapping curve 20 may be defined as a relation between the input brightness and the output brightness as illustrated in FIGS. 6 and 7. In other words, when brightness of the original image data 11 is given to N10, the brightness of the output image may be changed into N01 corresponding to N10 by applying the tone mapping curve 20 by the processor 110. In this case, the maximum value on the x axis of the tone mapping curve 20 may be defined as the maximum brightness of the image file 10 (e.g., 1000 nit) and the maximum value on the y axis of the tone mapping curve 20 may be defined as the maximum brightness of the image output (e.g., 500 nit) by the display apparatus 100.

The tone mapping curve 20 may include a linear region A1 that is extended from origin (0) to a first point P11 and has a linear shape, and a non-linear region A2 extended from the first point P11 (knee point). For example, the non-linear region A2 may have nth order function (N>1). Particularly, the non-linear region A2 may be given as quadratic function such as an equation 1.

$$y=4(1-x)^3 P_1 + 6x^2(1-x)^2 P_2 + 4x(1-3)^3 P_3 + x4$$ [Equation 1]

Alternatively, the non-linear region A2 of the tone mapping curve 20 may be defined by using at least on nth order function designed by a designer.

The tone mapping curve generator 115 may generate a tone mapping curve based on the brightness information 12-1.

Particularly, the tone mapping curve generator 115 may acquire the first point P11 by using at least two pieces of percentile information such as percentile information of 50% ile 12f and percentile information of 99% ile 12k, in the brightness information 12-1. Particularly, the tone mapping curve generator 115 may divide the percentile information of 50% ile 12f by any one (e.g., the greater value) of the percentile information of 99% ile 12k and a predetermined maximum value, so as to acquire a first ratio therebetween. As needed, the tone mapping curve generator 115 may shift the percentile information of 50% ile 12f to left side or right side by a predetermined bit, and then divide the shifted value by any one of the percentile information of 99% ile 12k and a predetermined maximum value, thereby acquiring a first ratio.

Sequentially, the tone mapping curve generator 115 may acquire a x axis coordinate of the first point P11 by applying the first ratio to a predetermined function (e.g., ramp function).

In addition, the tone mapping curve generator 115 may divide the maximum brightness of the input image by the maximum brightness of the output image so as to acquire a second ratio (it corresponds to a slope of the linear part) therebetween. The tone mapping curve generator 115 may acquire a y axis coordinate of the first point P11 by applying the second ratio to the acquired x axis coordinate of the first point P11.

As needed, the tone mapping curve generator 115 may adjust the acquired first point P11. For example, the tone mapping curve generator 115 may partially change the position of the first point P11 to allow the tone mapping curve 20 to have a S shape or to give a specific effect. In this case, the tone mapping curve generator 115 may change the position of the first point P11 by relatively reducing at least one of the x axis coordinate value and the y axis coordinate value of the first point P11.

Accordingly, the tone mapping curve generator 115 may acquire a linear function L1 (i.e., a linear function between the origin (0) and the first point P11) in the linear region A1.

Subsequently, the tone mapping curve generator 115 may acquire a function C0 about the non-linear region A2. For example, the tone mapping curve generator 115 may acquire a function C0 to C2 in the non-linear region A2 by calculating each of coefficients of Nth order function (e.g., P1, P2 and P3 of the equation 1).

In this case, the tone mapping curve generator 115 may acquire a first coefficient P1 of the equation 1 based on the slope of a straight line L1 passing between the origin (0) and the first point P11. The tone mapping curve generator 115 may select the first coefficient P1 as the same as the slope of the straight line L1 or acquire the first coefficient P1 by partially adjusting the slope of the straight line L1.

Subsequently, the tone mapping curve generator 115 may select at least one point such as a second point P12 and a third point P13, in the non-linear region A2, and then acquire a second coefficient P2 and a third coefficient P3 based on the first coefficient P1 and at least one point P12 and P13.

The tone mapping curve generator 115 may acquire coordinates of the at least one point P12 and P13 based on the at least one brightness information 12-1. In other words, the at least one point P12 and P13 may be acquired based on the percentile information of a certain value N % ile.

Particularly, the tone mapping curve generator 115 may acquire a third ratio by diving a difference between certain percentile information (e.g., percentile information of 50% ile 12f) and other percentile information (e.g., percentile information of 0% ile) by any one (e.g., the greater value) between certain percentile information (e.g., percentile information of 95% ile 12i) and a predetermined maximum value. In the same manner, the tone mapping curve generator 115 may acquire a fourth ratio by diving a difference between certain percentile information (e.g., percentile information of 75% ile 12g) and other percentile information (e.g., percentile information of 0% ile) by any one (e.g., the greater value) between certain percentile information (e.g., percentile information of 95% ile 12i) and a predetermined maximum value. In this case, a difference between certain percentile information and other percentile information may be shifted to left side or right side by a predetermined bit and then divided. A difference between other certain percentile information and other percentile information may be also shifted in the same manner.

Subsequently, the tone mapping curve generator 115 may acquire a first result value corresponding to the third ratio by applying the third value to the predetermined function (e.g., the above mentioned ramp function), and acquire a second result value corresponding to the fourth ratio by applying the fourth value to the predetermined function. The tone mapping curve generator 115 may acquire a first target value by interpolating the two result values by using an average or weighted average methods. In this case, the tone mapping curve generator 115 may apply a value (target_50_v2, target_50_v1, target_50_t11, and target_50_t12) related to the second point P12 to the predetermined function. In addition, in the same manner, the tone mapping curve generator 115 may acquire a third result value corresponding to the third ratio and a fourth result value corresponding to the fourth ratio by applying the third ratio and the fourth ratio together with a value (target_85_v2, target_85_v1, target_85_t11, and target_85_t12) related to the third point P13, to the predetermined function. The tone mapping curve generator 115 may acquire a second target value by interpolating the two result values by using an average or weighted average methods. The tone mapping curve generator 115 may acquire y value y 50 of the second point P12 by calculating a ratio between a difference between a horizontal line P11y passing the first point P11 and the maximum value, and a difference between the horizontal line P11y passing the first point P11 and the first target value in the non-linear region A2. In addition, the tone mapping curve generator 115 may acquire y value y 85 of the third point P13 by calculating a ratio between a difference between the horizontal line P11y passing the first point P11 and the maximum value, and a difference between the horizontal line P11y passing the first point P11 and the second target value in the non-linear region A2. Accordingly, the tone mapping curve generator 115 may acquire the second coefficient P2 and the third coefficient P3 of the tone mapping curve 20 based on the x-axis coordinate x50 and the y-axis coordinate y50 corresponding to the second point P12 and the x-axis coordinate x85 and the y-axis coordinate y85 corresponding to the third point P13. Therefore, all coefficients P1 to P3 of the equation 1 may be acquired and then the tone mapping curve 20 may be generated.

Figure 8A:
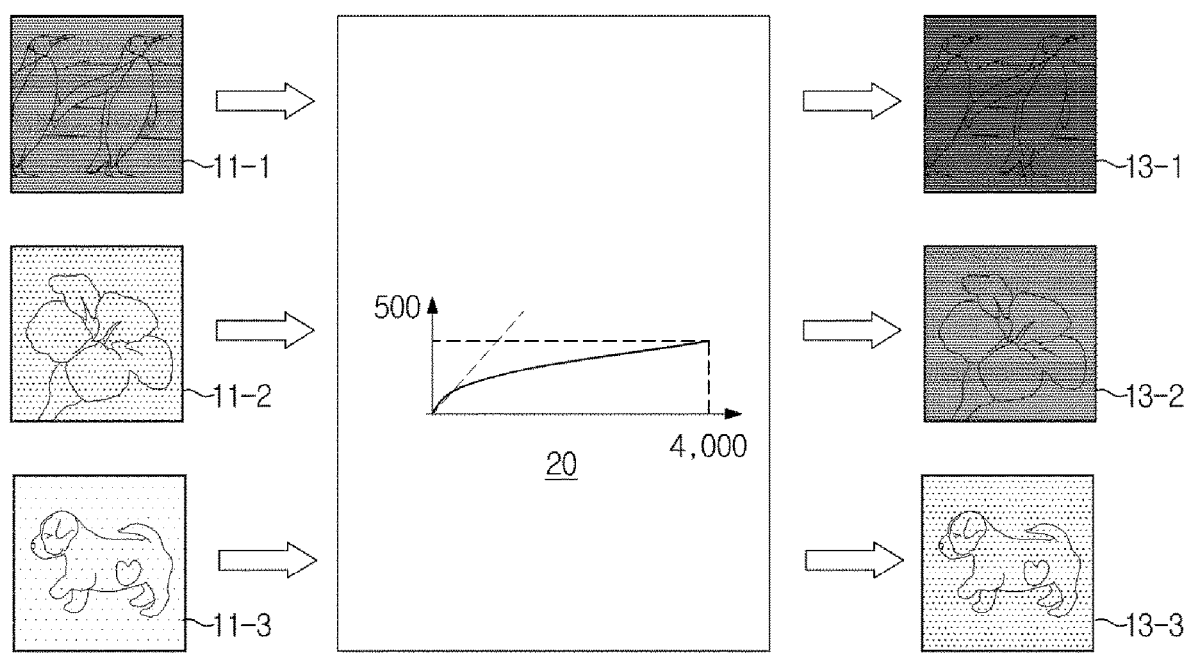
FIG. 8A is a view illustrating an example of a variation of an image depending on applying a tone mapping curve.
Figure 8B:
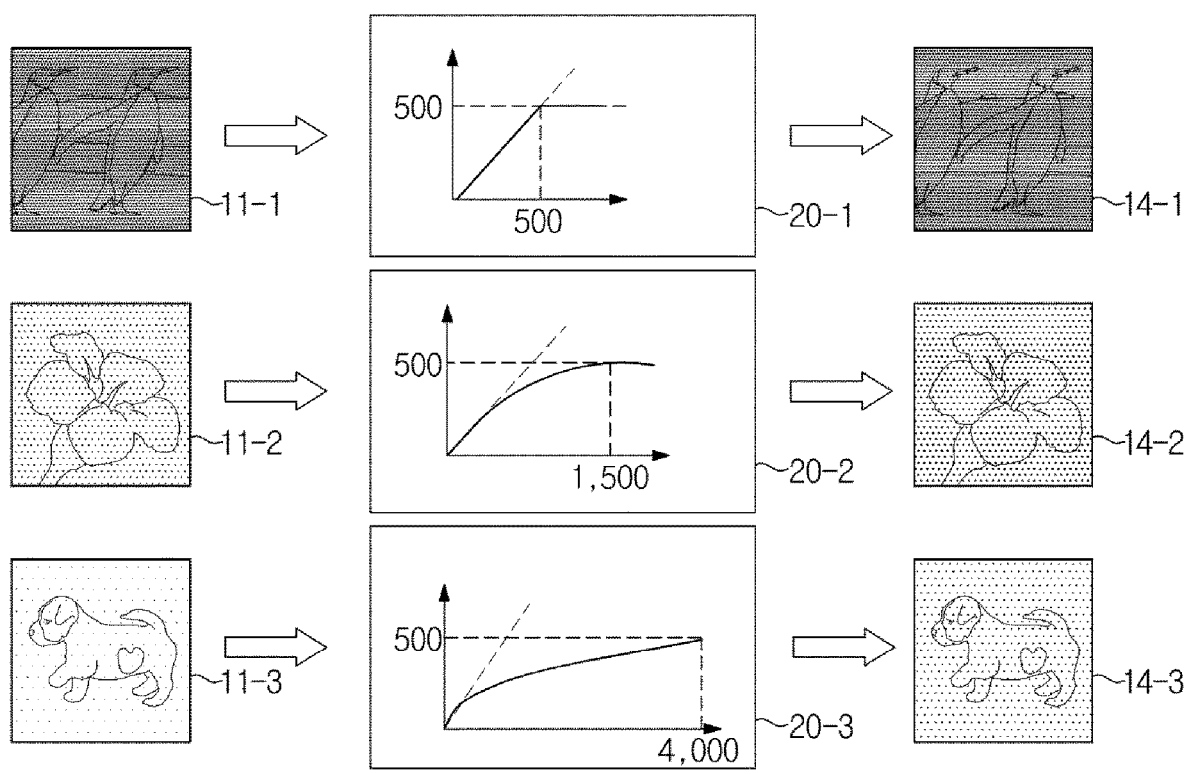
FIG. 8B is a view illustrating an example of a variation of an image depending on applying a tone mapping curve.

FIG. 8A is a view illustrating an example of a variation of an image depending on applying a tone mapping curve and FIG. 8B is a view illustrating an example of a variation of an image depending on applying a tone mapping curve.

The tone mapping curve applicator 117 may receive the tone mapping curve 20 generated in the tone mapping curve generator 115 and the image data 11 from the metadata extractor 111 or the first image processor 113, thereby applying the tone mapping curve 20 to the image data 11.

When the display apparatus 100 performs the static tone mapping, the tone mapping curve generator 115 may generate a single tone mapping curve 20a, as illustrated in FIG. 8A, and then the tone mapping curve applicator 117 may apply the same tone mapping curve 20a to all the cuts or scenes 11-1 to 11-3 in the image data 11. Therefore, the output image 13-1 to 13-3 corresponding to the cut or scent 11-1 to 11-3 may be changed to have the same brightness or have the brightness similar with each other. Accordingly, a relatively dark image 11-1 may be converted into a darker image 13-1 and then displayed. A relatively bright image 11-3 may be converted into an image 13-3 having proper brightness and then displayed.

When the display apparatus 100 performs the dynamic tone mapping, the tone mapping curve generator 115 may generate a plurality of tone mapping curves 20-1 to 20-3, as illustrated in FIG. 8B. The plurality of tone mapping curves 20-1 to 20-3 may be generated for each cut or each scene. Accordingly, the tone mapping curve applicator 117 may apply the tone mapping curves 20-1 to 20-3 to all cuts or each scene in the image data 11. Particularly, the tone mapping curve applicator 117 may apply corresponding tone mapping curves to corresponding cut or scene or apply the same tone mapping curve to some of cuts or scenes. Therefore, brightness of the output image 13-1 to 13-3 corresponding to the all cuts or scenes 11-1 to 11-3 may be differently changed from each other (some cuts or scenes are changed to have the same brightness). Therefore, a relatively dark image 11-1 may be converted into a relatively bright and appropriate image 14-1 and then displayed and a relatively bright image 11-3 may be converted into a relatively dark and appropriate image 14-3 then displayed.

Referring again to FIG. 2, the second image processor 119 may change an optical reference signal of the tone-mapped image, to an electrical reference signal. The second image processor 119 may perform a final gamma processing on the tone-mapped image. A signal output by the second image processor 119 may be transmitted to the display 103.

The display 103 may display the tone-mapped image to the outside. For example, the display 103 may be implemented by using a display panel. The display panel may include a plasma display panel (PDP), a light emitting diode (LED) display panel and/or a liquid crystal display (LCD). The light emitting diode (LED) display panel may include organic light emitting diode (OLED). The organic light emitting diode (OLED) may include Passive Matrix OLED (PMOLED), or Active Matrix OLED (AMOLED). Alternatively, depending on embodiments, the 190 may include cathode ray tube (CRT). In addition, the display 103 may include at least one device capable of displaying a screen, other than the above mentioned examples.

The storage 105 may temporarily or non-temporarily store a variety of information for the operation of the processor 110. For example, the storage 105 may store a variety of applications (it is referred to as a program or an APP) related to the generation of the tone mapping curve 20. The application may be stored and/or updated in the storage 105 during the production or distribution of the display apparatus 100, and/or the application may be stored and/or updated after being received via the electronic software distribution network. For example, the storage 105 may include at least one of a main memory and an auxiliary memory.

Hereinafter embodiments of using the image providing apparatus 120 to receive the image file 10 will be described.

Figure 9:
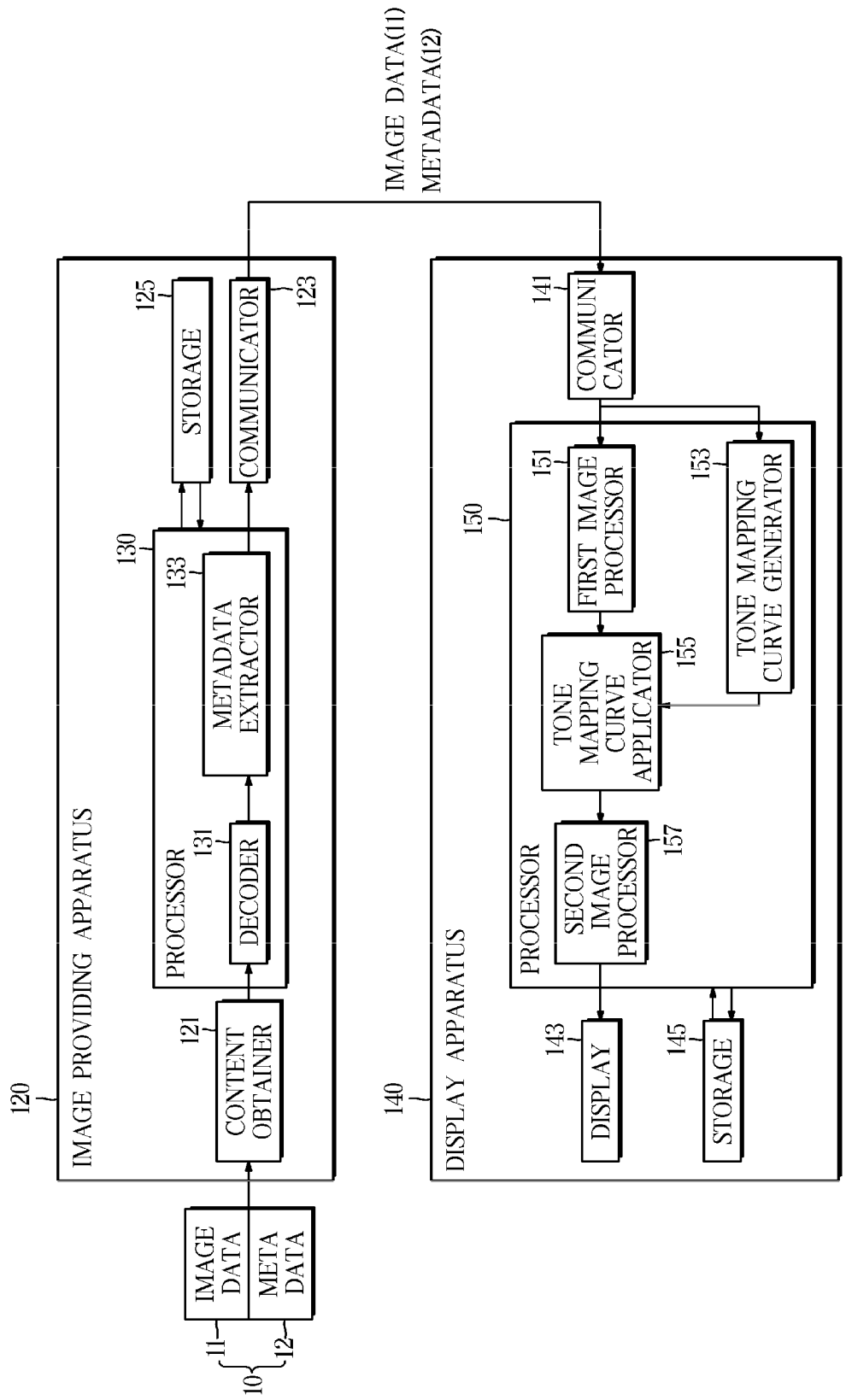
FIG. 9 is a block diagram illustrating an embodiment of an image providing apparatus and a display apparatus.

FIG. 9 is a block diagram illustrating an embodiment of an image providing apparatus and a display apparatus.

Referring to FIG. 9, according to an embodiment, the image providing apparatus 120 may include a content obtainer 121 acquiring the image file 10 including the image data 11 and the metadata 12, a processor 130 acquiring metadata 12 from the acquired image file, a communicator 123 transmitting the acquired metadata 12 to an external display apparatus 140, and a storage 125 temporarily or non-temporarily store a variety of information for an operation of the image providing apparatus 120.

The content obtainer 121 may be communicably connected to at least one of the image producer terminal apparatus 9, the transmitter 8 and the image providing apparatus 120. The content obtainer 121 may receive the image file 10 and transmit the received image file 10 to the processor 130.

Depending on embodiments, the content obtainer 121 may be replaced with a reader configured to be readable data from a mounted-recording medium (e.g., DVD or Blu-ray).

The processor 130 may acquire the image data 11 and the metadata 12 from the image file 10 transmitted from the content obtainer 121. Particularly, the processor 130 may include a decoder 131 decoding compressed image data 10, and a metadata extractor 133 acquiring the metadata 12 from the decoded image data 10.

The decoder 131 may decode the image data 10 using a predetermined codec.

The metadata extractor 133 may acquire information on the brightness contained in the metadata 12 from the decoded image data 10. In addition, the decoder 131 may insert information on the acquired brightness into a VSIF format transmitted via HDMI.

The communicator 123 may transmit the image data 11 and the metadata 12 having the brightness information to the display apparatus 140 by using VSIF that is specified in HDMI standard. Alternatively, the communicator 123 may be configured to communicate with a communicator 141 of the display apparatus 140 based on the standard technology such as USB or IEEE 1394.

The display apparatus 140 may perform the image processing based on the received image data 11 and the metadata 12, and then display the processed image to the outside.

Particularly, the display apparatus 140 may include the communicator 141, a display 143, a storage 145 and a processor 150.

The communicator 141 of the display apparatus 140 may receive the image data 11 and the metadata 12 from the image providing apparatus 120 and then transmit it to the processor 150.

The processor 150 may generate the tone mapping curve 20 based on the metadata 12 and perform the image processing on the image data 11 by applying the generated tone mapping curve 20 to the image data 11. According to an embodiment, the processor 150 may include a first image processor 151, a tone mapping curve generator 153, a tone mapping curve applicator 155 and a second image processor 157. Alternatively, some of the above mentioned components may be omitted. The first image processor 151, the tone mapping curve generator 153, the tone mapping curve applicator 155 and the second image processor 157 may be implemented as practically same as or implemented by partially modifying the first image processor 113, the tone mapping curve generator 115, the tone mapping curve applicator 117 and the second image processor 119. Therefore, description thereof will be omitted.

The display 143 may output or display the image on which the tone mapping curve 20 is applied, and the storage 145 may store a variety of applications and data required for the operation of the processor 150. The display 143 and the storage 145 may be practically same as the display 103 and the storage 105 of the display apparatus 100 and thus a description thereof will be omitted.

Hereinafter another embodiment of the image providing system will be described with reference to FIGS. 10 to 16. In describing another embodiment of the image providing system 2, descriptions of practically the same parts as the image providing system 1 according to the above-described an embodiment may be omitted for avoiding redundant description. However, even if a description of a part of the configuration of the image providing system 2 is omitted, it should be understood that the image providing system 2 to be described later does not exclude the omitted structure, operation or method.

Figure 10:
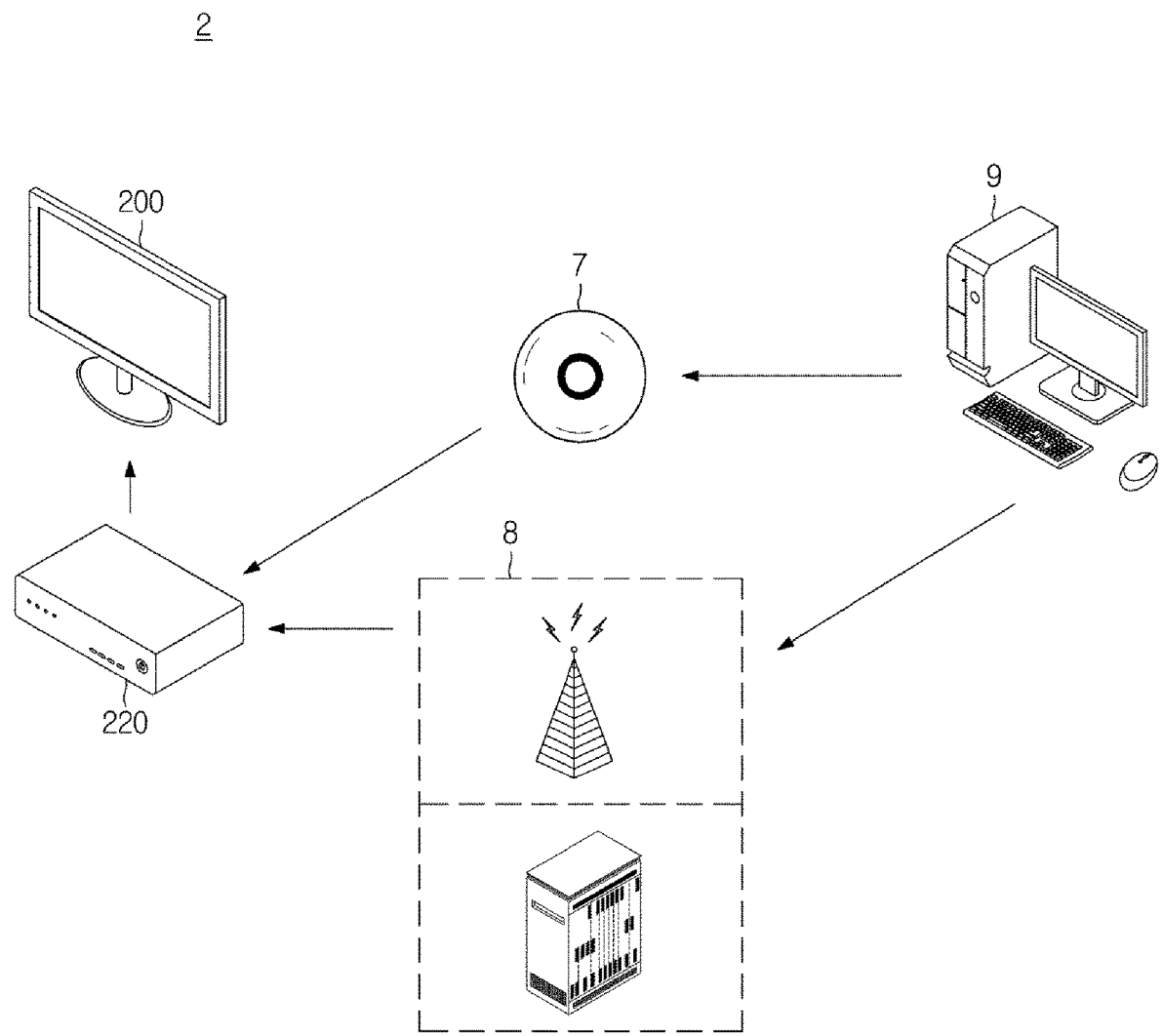
FIG. 10 is a schematic diagram of an image providing system according to another embodiment.
Figure 11:
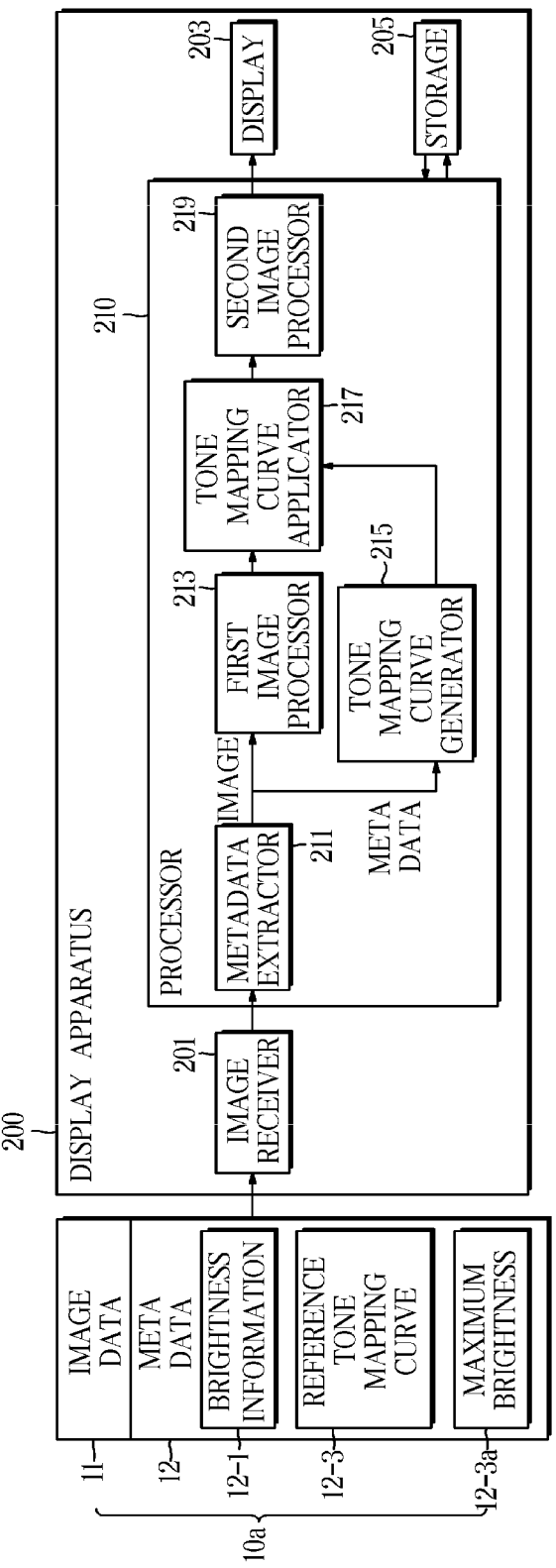
FIG. 11 is a block diagram illustrating a display apparatus according to another embodiment.

FIG. 10 is a schematic diagram of an image providing system according to another embodiment and FIG. 11 is a block diagram illustrating a display apparatus according to another embodiment.

As illustrated in FIG. 10, according to another embodiment, in order to provide an image to a display apparatus 200, an image providing system 2 may include the display apparatus 200, an image producer terminal apparatus 9 configured to produce an image file 10a related to an image to be displayed on the display apparatus 200, and an image providing apparatus 220 configured to provide the image file 10a to the display apparatus 200.

According to another embodiment, the image file 10a may be transmitted from the image producer terminal apparatus 9 to the image providing apparatus 220 or the image file 10a may be provided to the image providing apparatus 220 in the form of an optical disc. The image providing apparatus 220 may acquire metadata 12 from the image file 10a and transmit the metadata 12 to the display apparatus 200.

Referring to FIG. 11, the image file 10a transmitted from the image providing apparatus 220 to the display apparatus 200 may include the image data 11 for reproducing an image and the metadata 12 added to the image data 11. The metadata 12 may further include reference tone mapping curve 12-3, in addition to the brightness information 12-1.

Figure 12:
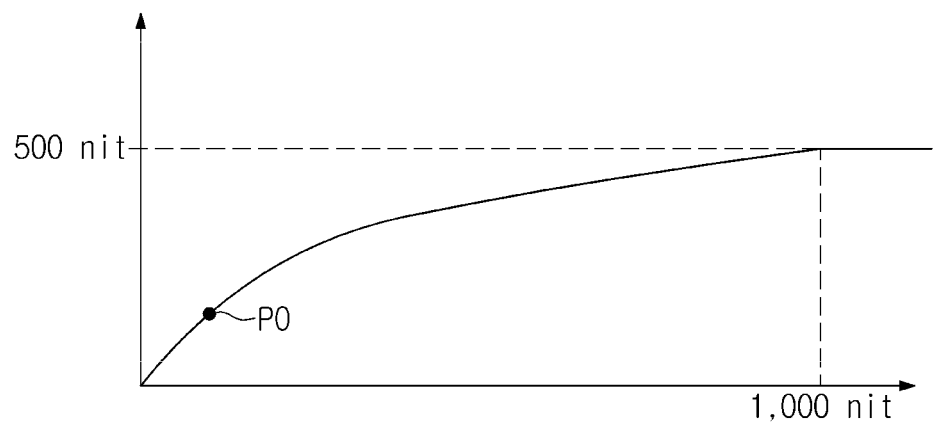
FIG. 12 is a view illustrating an embodiment of a reference tone mapping curve.

FIG. 12 is a view illustrating an embodiment of a reference tone mapping curve, and FIG. 13 is a view illustrating a part of a transmission format transmitted from the image providing apparatus to the display apparatus.

As illustrated in FIG. 11, the image file 10a may include the image data 11 for reproducing an image and the metadata 12 added to the image data 11.

The image data 11 and the metadata 12 transmitted to the display apparatus 200 by the image providing apparatus 220 may further include the reference tone mapping curve 12-3, in addition to the brightness information 12-1.

In the same manner as an embodiment, the brightness information 12-1 may represent information indicating brightness of the image data 11. For example, the brightness information 12-1 may include percentile information defined based on a histogram that is generated by accumulating the greatest values of the brightness of the sub-pixels 11-a1 to 11-d4 contained in each of the pixels 11-a to 11-d.

The reference tone mapping curve 12-3 represents a tone mapping curve about image data 11 that is produced by the image producer terminal apparatus 9 or created and defined and/or defined by the image producer. The reference tone mapping curve 12-3 may be contained to the metadata 12 and then provided to the display apparatus 200. Particularly, the reference tone mapping curve 12-3 may include a tone mapping curve generated based on brightness of a reference display apparatus. The reference display apparatus may include a display apparatus provided in the image producer terminal apparatus 9 (e.g., a display mounted to a terminal apparatus or a monitor device connected through a cable), or a display apparatus (not shown) separately provided from the image producer terminal apparatus 9.

Particularly, when a user of the image producer terminal apparatus 9 (e.g., a content creator) produces an image by using the image producer terminal apparatus 9, the image producer terminal apparatus 9 may generate the reference tone mapping curve 12-3 that is a tone mapping curve applicable to an image by using the reference display apparatus that is the maximum brightness corresponding to the reference tone mapping curve, wherein the image producer terminal apparatus 9 may generate the reference tone mapping curve 12-3 by an operation of the user or the image producer terminal apparatus 9 may automatically generate the reference tone mapping curve 12-3 by a predetermined setting. The reference tone mapping curve 12-3 may be defined for each frame or each cut or each scene in the image data 11. In other words, a plurality of reference tone mapping curves 12-3 may be contained in a single image file 10*a*. The plurality of reference tone mapping curves 12-3 may be used in the operation of the dynamic tone mapping process. In addition, the reference tone mapping curve 12-3 may be defined for the entire image. In other words, one reference tone mapping curve 12-3 may be contained in one image file 10*a*. One reference tone mapping curve 12-3 may be used in the static tone mapping process.

Depending on embodiments, the image producer terminal apparatus 9 may generate the reference tone mapping curve 12-3 based on the maximum brightness (e.g., 1000 nit) of the produced image and/or or the maximum brightness (e.g., 500 nit) of the reference display apparatus.

In this case, the metadata 12 transmitted to the display apparatus 200 may include the maximum brightness 12-3.

The maximum brightness of the image may be equal to or different from the maximum brightness of the reference display apparatus. In the latter case, the maximum brightness of the image may be greater than the maximum brightness of the reference display apparatus, or the maximum brightness of the image may be less than the maximum brightness of the reference display apparatus.

Referring to FIG. 13, the image providing apparatus 220 may acquire the brightness information 12-1 (distribution_maxrgb_percentiles), the reference tone mapping curve (Knee point 12-4*a*, and Bezier_curve_anchors 12-4*b*), and the brightness of the reference display apparatus 12-5 (targeted_system_display_maximum_luminance), from the image data and the metadata transmitted from the image producer terminal apparatus 9 or the image data and the metadata 11 acquired by decoding the optical disc.

Each piece of information may be contained in the SEI section of the image file 10*a* produced by the image producer terminal apparatus 9.

Each piece of information may be contained in the SEI section that is acquired by decoding content that is encoded in the optical disc.

Each piece of information may be contained in a playlist section that is acquired by decoding content that is encoded in the optical disc.

The image providing apparatus 220 may acquire each piece of information contained in the SEI section, insert the acquired information into the VSIF structure of FIG. 13, and transmit the information to the display apparatus 200 through the HDMI.

The brightness information 12-1, particularly, different plurality pieces of percentiles information (e.g., information about each of 1% ile, 5% ile, 10% ile, 25% ile, 50% ile, 75% ile, 90% ile, 95% ile, 98% ile and 99% ile) may be recorded in a first section 121.

The information 12-4*a* and 12-4*b* on the reference tone mapping curve 12-3 may be assigned to a second section 12*m* and a third section 12*n* different from the first section 121, and transmitted to the display apparatus via the HDMI. Particularly, information on a point P0 corresponding to a knee point, that is placed on an end of the linear region A1 of the reference tone mapping curve 12-3 may be assigned to the second section 12*m* and then transmitted to the display apparatus via the HDMI. Information on the function (e.g., the equation 1) corresponding to the non-linear region A2 of the reference tone mapping curve 12-3 may be assigned to the third section 12*n* and then transmitted to the display apparatus via the HDMI.

In this case, the information on the function corresponding to the non-linear region A2 may include the coefficients (e.g., P1 to P9) of the function corresponding to the non-linear region A2. The coefficient of the function may be transmitted to the display apparatus via the HDMI corresponding to the order of the function corresponding to the non-linear region A2.

For example, as for a quadratic function, since information about the three coefficients P1 to P3 is transmitted and since the tone mapping curve is linear from the origin to the knee point P0 and the coefficients of the function P1 to P9 from the knee point P0 to other section are given, it may be possible to identify and acquire the reference tone mapping curve 12-3 based on only data stored in the second section 12*m* and the third section 12*n*.

The display apparatus 200 according to another embodiment will be described in details with reference to FIG. 11 again. A description of the same parts as those shown in FIG. 2 will be omitted.

As illustrated in FIG. 11, the display apparatus 200 may include an image receiver 201, a processor 210 performing an image processing on the received image file 10*a*, a display 203 displaying an image and a storage 205 storing a variety of information needed for an operation of the processor 210.

The image receiver 201 may receive the image file 10*a* transmitted by the image providing apparatus 220 and transmit the received image file 10*a* including metadata having the brightness information 12-1 and the reference tone mapping curve 12-3, to the processor 210. The image receiver 201 may further receive audio data, as needed.

The processor 210 may perform a predetermined image processing on the image data 11 based on the metadata 12 obtained from the image file 10*a* transmitted from the image receiver 201.

The processor 210 may include a metadata extractor 211 obtaining the metadata 12 from the image file 10*a*, a first image processor 213 performing a certain image processing on the image data 11, a tone mapping curve generator 215 generating a tone mapping curve 30: 30-1 to 30-4 (refer to FIGS. 14 to 16) about the image data 11 based on the metadata 12, a tone mapping curve applicator 217 applying the tone mapping curve 20 to the image data 11, and a second image processor 219 performing an additional image processing as needed. As mentioned above, it should be understood that the above mentioned components 211 to 219 is not physically separated from each other, and thus at least one of the above mentioned components 211 to 219 may be physically or logically separated from each other, depending on embodiments.

The metadata extractor 211 may receive the image file 10*a* from the image receiver 201, acquire the metadata 12 from the transmitted image file 10*a*, and transmit the acquired metadata 12 to the tone mapping curve generator 215. For example, the first image processor 213 may convert the image data 11 to allow the tone mapping curve to be applied thereto. The tone mapping curve applicator 217 may apply the tone mapping curve 30: 30-1 to 30-4 to the image data 11 by using the tone mapping curve generated in the tone mapping curve generator 215. The second image processor 219 may change an optical reference signal of the image, on which the tone mapping is performed by the tone mapping curve applicator 217, to an electrical reference signal.

The function or operation of the metadata extractor 211, the first image processor 213, the tone mapping curve applicator 217 and the second image processor 219 may practically be same as the metadata extractor 111, the first image processor 113, the tone mapping curve applicator 117 and the second image processor 119. Therefore, description thereof will be omitted.

Figure 14:
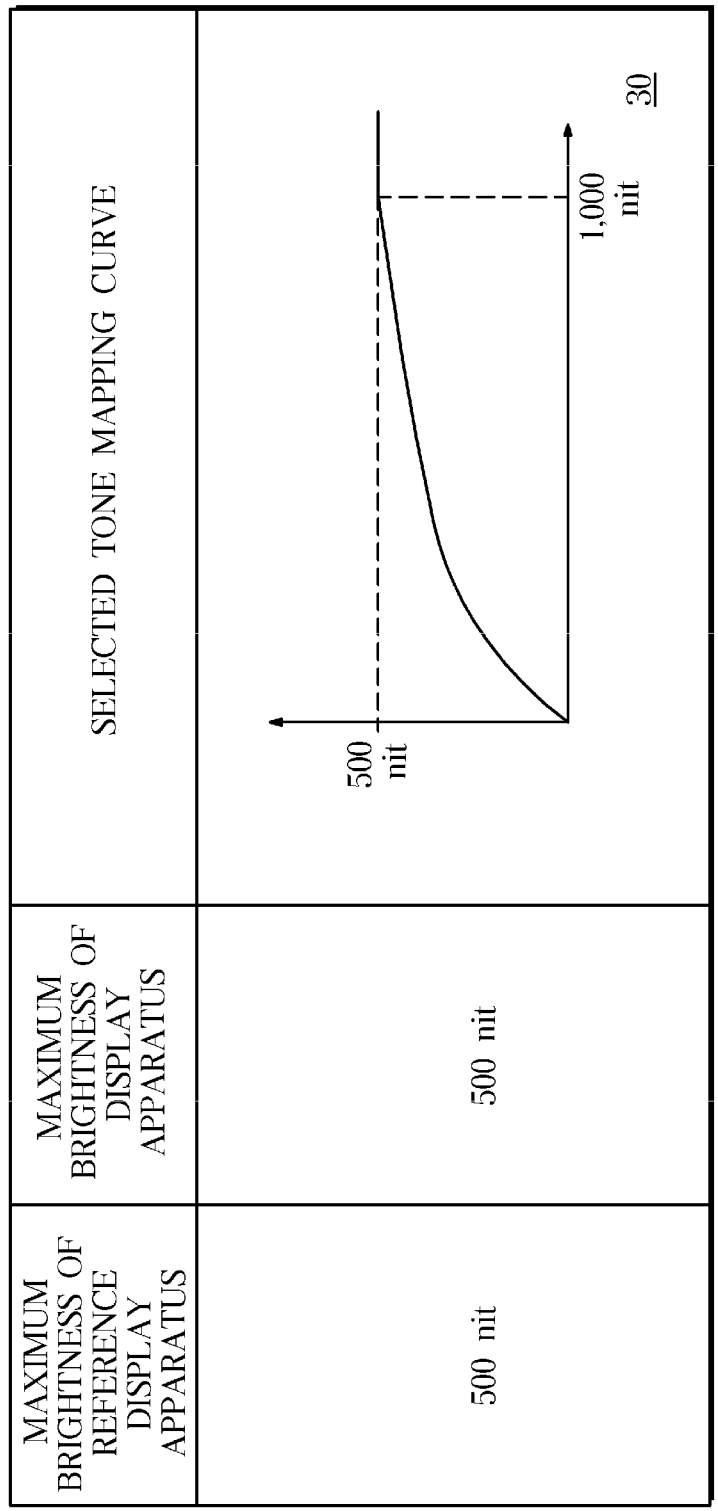
FIG. 14 is a first view of acquiring a tone mapping curve based on information on brightness of image and a reference tone mapping curve.
Figure 15:
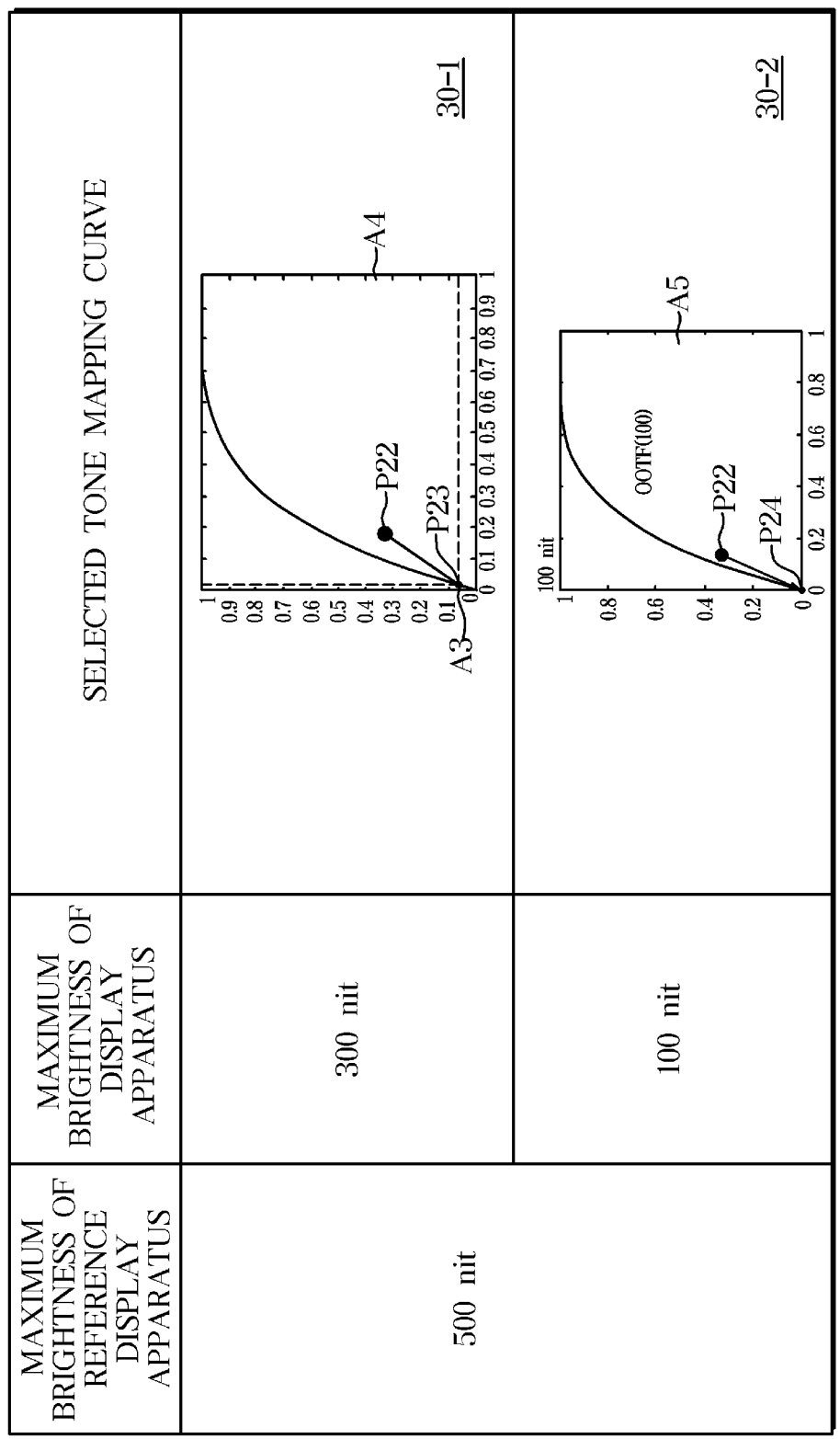
FIG. 15 is a second view of acquiring a tone mapping curve based on information on brightness of image and a reference tone mapping curve.
Figure 16:
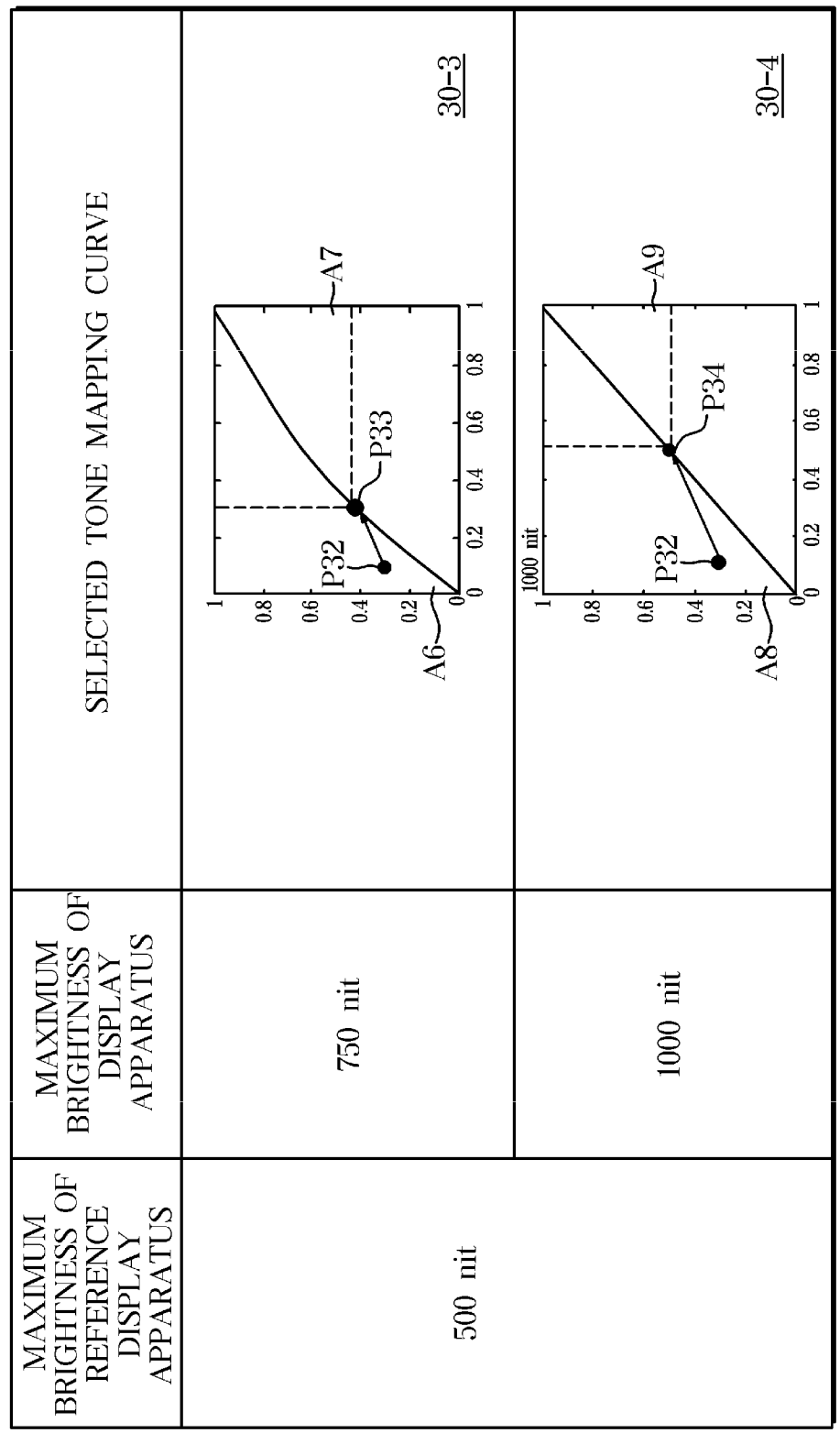
FIG. 16 is a third view of acquiring a tone mapping curve based on information on brightness of image and a reference tone mapping curve.

FIG. 14 is a first view of acquiring a tone mapping curve based on information on brightness of image and reference tone mapping curve, FIG. 15 is a second view of acquiring a tone mapping curve based on information on brightness of image and reference tone mapping curve, and FIG. 16 is a third view of acquiring a tone mapping curve based on information on brightness of image and reference tone mapping curve. In FIGS. 14 to 16, it is assumed that the maximum brightness of the image is 1000 nit and the maximum brightness of the reference display apparatus is 500 nit, but it is merely an example.

The tone mapping curve generator 215 may generate the tone mapping curve 30: 30-1 to 30-4 by using the metadata 12

Particularly, the tone mapping curve generator 215 may compare the maximum brightness of the reference display apparatus 12-3a with the maximum brightness of the display apparatus 200 (it represents the maximum brightness of the display 203, which is a pre-stored value in the storage 205), and select or generate the tone mapping curve 30: 30-1 to 30-4 based on the result of comparison.

As illustrated in FIG. 14, when the maximum brightness of the reference display apparatus 12-3a is the same as or similar with the maximum brightness of the display apparatus 200 (e.g., the brightness of the both display apparatus is 500 nit) the tone mapping curve generator 215 may select the transmitted reference tone mapping curve 12-3 as a tone mapping curve 30 to be applied to the image data 11. In other words, the selected tone mapping curve 30 may be the same as the reference tone mapping curve 12-3. The selected tone mapping curve 30 may be transmitted to the tone mapping curve applicator 217.

As illustrated in FIG. 15, when the maximum brightness of the reference display apparatus 12-3a is different from the maximum brightness of the display apparatus 200 and the maximum brightness of the reference display apparatus 12-3a is greater than the maximum brightness of the display apparatus 200, the tone mapping curve generator 215 may generate a new tone mapping curve 30-1 and 30-2 based on the reference tone mapping curve 12-3.

For example, the tone mapping curve generator 215 may move the knee point P22 of the reference tone mapping curve 12-3 relatively closer to the origin 0 to select a knee point P23 and P24 of the new tone mapping curve 30-1 and 30-2 and calculate a function in a non-linear region A4 and A5 starting from the selected knee point P23 and P24, thereby newly acquiring tone mapping functions 30-1 and 30-2 based on the knee point P23 and P24 and the function in the non-linear region A4 and A5.

According to an embodiment, the tone mapping curve generator 215 may move the knee point P23 and P24 relatively closer to the origin 0 than the knee point P22 of the reference tone mapping curve 12-3, as the difference between the maximum brightness of the reference display apparatus 12-3a and the maximum brightness of the display apparatus 200 is greater (that is, the maximum brightness of the display apparatus 200 is relatively less than the maximum brightness of the reference display apparatus). For example, when the maximum brightness of the display apparatus 200 is sufficiently low (e.g., 100 nit), the tone mapping curve generator 215 may select the origin 0 or a point adjacent to the origin 0 as the knee point P24, and when the maximum brightness of the display apparatus 200 is relatively less low (e.g., 300 nit), the tone mapping curve generator 215 may select a point relatively far from the origin 0 as the knee point P24.

Depending on embodiment, the tone mapping curve generator 215 may select the position of the knee point P23 and P24 proportionally according to the maximum brightness of the display apparatus 200. In addition, the tone mapping curve generator 215 may select the position of the knee point P23 in a state in which the maximum brightness of the display apparatus 200 is relatively low, based on the knee point P22 of the reference tone mapping curve 12-3 and based on the knee point P24 in a state in which the maximum brightness of the display apparatus 200 is sufficiently low. For example, the tone mapping curve generator 215 may select the knee point P22 of the reference tone mapping curve 12-3 and the knee point P24, in a state in which the maximum brightness of the display apparatus 200 is sufficiently low, and then select the position of the knee point P23, in a state in which the maximum brightness of the display apparatus 200 is relatively low, by applying the predetermined interpolation method to the selected knee points P22 and P24.

Sequentially, the tone mapping curve generator 215 may calculate a function about the non-linear region A4 and A5. Depending on embodiments, the tone mapping curve generator 215 may calculate a function about the non-linear region A4 and A5 by using the coefficients P1 to P9 of the reference tone mapping curve 12-3. Alternatively, the tone mapping curve generator 215 may calculate a function about the non-linear region A4 and A5 based on the brightness information 12 that is transmitted in FIG. 7.

Accordingly, the tone mapping curve generator 215 may acquire the tone mapping curves 30-1 and 30-2 corresponding to the maximum brightness of the display apparatus 200.

As illustrated in FIG. 16, when the maximum brightness of the reference display apparatus 12-3a is different from the maximum brightness of the display apparatus 200 and the maximum brightness of the display apparatus 200, which is to display an image, is greater than the maximum brightness of the reference display apparatus 12-3a, the tone mapping curve generator 215 may generate new tone mapping curves 30-1 and 30-2.

For example, the tone mapping curve generator 215 may select knee points P33 and P34 of new tone mapping curves 30-3 and 30-4 by correcting the knee point P22 of the reference tone mapping curve 12-3 by moving the knee point P22 of the reference tone mapping curve 12-3 relatively far from the origin 0, and calculate a function in non-linear regions A7 and A8, thereby acquiring tone mapping functions 30-3 and 30-4.

According to an embodiment, in the same manner as the above mention, the tone mapping curve generator 215 may compare the maximum brightness of the reference display apparatus 12-3a with the maximum brightness of the display apparatus 200 and when the maximum brightness of the display apparatus 200 is greater than the maximum brightness of the reference display apparatus 12-3a, the tone mapping curve generator 215 may acquire the tone mapping functions 30-3 and 30-4 based on the maximum brightness of the display apparatus 200.

For example, as the maximum brightness of the display apparatus 200 is greater (i.e., the maximum brightness of the display apparatus 200 is relatively greater than the maximum brightness of the reference display apparatus), the tone mapping curve generator 215 may select a point, which is farther from the origin 0 than the knee point P22 of the reference tone mapping curve 12-3, as the knee points P33 and P34. In this case, as the maximum brightness of the display apparatus 200 is relatively greater, the tone mapping curve generator 215 may select a point, which is farther from the origin 0 than the knee point P22 of the reference tone mapping curve 12-3, as the knee points P33 and P34. For example, when the maximum brightness of the display apparatus 200 is sufficiently high (e.g., 1000 nit), the tone mapping curve generator 215 may select a point, which is relatively far from the origin 0, (e.g., the center point of the tone mapping cover 30-4), as the knee point P34. In this case, a function of the non-linear region A9 may be implemented in the linear function that is the same as the function of the non-linear region A8. In addition, when the maximum brightness of the display apparatus 200 is relatively less great (e.g., 700 nit), the tone mapping curve generator 215 may select a point, which is relatively less far from the origin 0, as the knee point P33.

Depending on embodiment, the tone mapping curve generator 215 may select the position of the knee point P33 and P34 proportionally according to the maximum brightness of the display apparatus 200. The tone mapping curve generator 215 may select the position of P33 in a state in which the maximum brightness of the display apparatus 200 is relatively less low, based on the knee point P22 of the reference tone mapping curve 12-3 and based on the knee point P34 in a state in which the maximum brightness of the display apparatus 200 is sufficiently high.

When the knee points P34 and P35 are selected, the tone mapping curve generator 215 may calculate a function about the non-linear regions A7 and A8. The tone mapping curve generator 215 may calculate a function about the non-linear region A4 and A5 by using the coefficient P1 to P9 of the tone mapping curve 12-3. Alternatively, the tone mapping curve generator 215 may calculate a function about the non-linear region A4 and A5 based on the brightness information 12 that is transmitted in FIG. 7.

Accordingly, when the maximum brightness of the display apparatus 200 is relatively high, the tone mapping curve generator 215 may generate and acquire the tone mapping curve 30-3 and 30-4 which are appropriate for the display apparatus 200.

The tone mapping curve 30: 30-1 to 30-4 generated by the tone mapping curve generator 215 may be transmitted to the tone mapping curve applicator 217 and the tone mapping curve applicator 217 may apply the tone mapping curve 30: 30-1 to 30-4 to the image file 10a.

Hereinbefore the operation of the tone mapping curve generator 215 when the maximum brightness of the image is 1000 nit and the maximum brightness of the reference display apparatus is 500 nit, has been described with reference to FIGS. 14 to 16. However, it should be understood that the above mentioned operation of the tone mapping curve generator 215 or specific values related thereto are merely example and thus the operation and the values may vary according to the conditions or the designer's choice.

The display 203 and the storage 205 may be implemented as practically same as or implemented by partially modifying the display 103 and the storage 105 of the display apparatus 100 according to an embodiment. Therefore, description thereof will be omitted.

Hereinafter another embodiment of the image providing system will be described with an example in which the image providing apparatus 220 is used for the reception of the image file 10a. In describing another embodiment of the image providing apparatus 220, descriptions of practically the same parts as the above-described an embodiment may be omitted for avoiding redundant description. However, even if a description of a part of the configuration thereof is omitted, it should be understood that the image providing system 2 to be described later does not exclude the omitted structure, operation or method.

Figure 17:
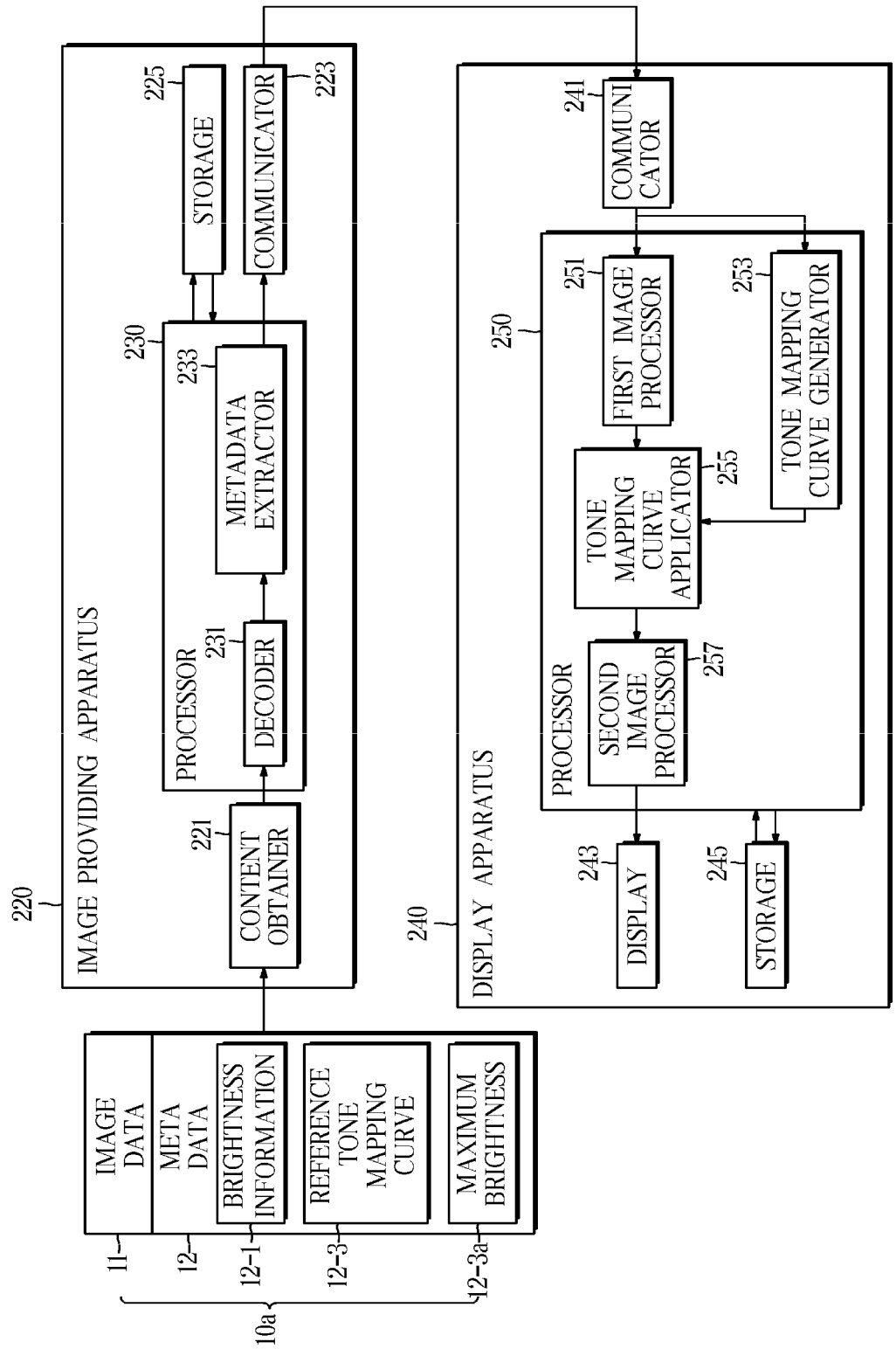
FIG. 17 is a block diagram illustrating an image providing apparatus according to another embodiment.

FIG. 17 is a block diagram illustrating an image providing apparatus according to another embodiment.

Referring to FIG. 17, according to another embodiment, the image providing apparatus 220 may include a content obtainer 221 acquiring the image file 10a including the image data 11 and the metadata 12, a processor 230 acquiring metadata 12 from the acquired image file, a communicator 223 transmitting the acquired metadata 12 to an external display apparatus 240, and a storage 225 temporarily or non-temporarily store a variety of information for an operation of the image providing apparatus 220.

The content obtainer 221 may receive the image file 10a from at least one of the image producer terminal apparatus 9, the transmitter 8 and the image providing apparatus 220, and transmit the received image file 10a to the processor 230. Depending on embodiments, the image providing apparatus 220 may include a reader configured to read data from the recording medium, instead of the content obtainer 121.

The image file 10a in the compressed type may be transmitted to the image providing apparatus 220 from the image producer terminal apparatus 9.

The processor 230 may acquire the image data 11 and the metadata 12 from the image file 10a transmitted from the content obtainer 221.

Particularly, the image providing apparatus 220 may include a decoder 231 decoding the compressed image file 10a by using a predetermined codec, and a metadata extractor 233 acquiring the metadata 12 from the decoded data. By the metadata extractor 233, the image providing apparatus 220 may acquire the brightness information 12-1, the reference tone mapping curve 12-3 and the maximum brightness 12-3a from the image file 10a.

The communicator 223 may be communicably connected to a communicator 241 of a display apparatus 240 and transmit the image data 11 and the acquired metadata 12 to the display apparatus 240 through HDMI as illustrated in FIG. 13.

Therefore, the image providing apparatus 220 may transmit the brightness information 12-1, the reference tone mapping curve 12-3 and the maximum brightness 12-3a to the display apparatus 240.

The display apparatus 240 may display an image corresponding to the image data 11 on a display 243. However, before outputting the image, the display apparatus 240 may perform an image processing by using the brightness information 12-1, the reference tone mapping curve 12-3 and the maximum brightness 12-3a, which are acquired and transmitted by the image providing apparatus 220.

Particularly, a processor 250 of the display apparatus 240 may include a first image processor 251 converting the image data 11 to allow the tone mapping curve to be applied to the image data 11, a tone mapping curve generator 253 generating a certain tone mapping curve 30: 30-1 to 30-4 (refer to FIGS. 14 to 16) by using the brightness information 12-1, the reference tone mapping curve 12-3 and the maximum brightness 12-3a, a tone mapping curve applicator 255 applying the tone mapping curve 30: 30-1 to 30-4 to the image data 11, and a second image processor 257 changing an optical reference signal of the image, on which the tone mapping is performed, to an electrical reference signal. At least one of the above mentioned components 251 to 257 may be omitted. The first image processor 251, the tone mapping curve generator 253, the tone mapping curve applicator 255 and the second image processor 257 may be implemented as practically same as or implemented by partially modifying the first image processor 213, the tone mapping curve generator 215, the tone mapping curve applicator 217 and the second image processor 219. Therefore, description thereof will be omitted.

Hereinafter a method for controlling the display apparatus according to embodiments will be described with reference to FIGS. 18 and 19.

Figure 18:
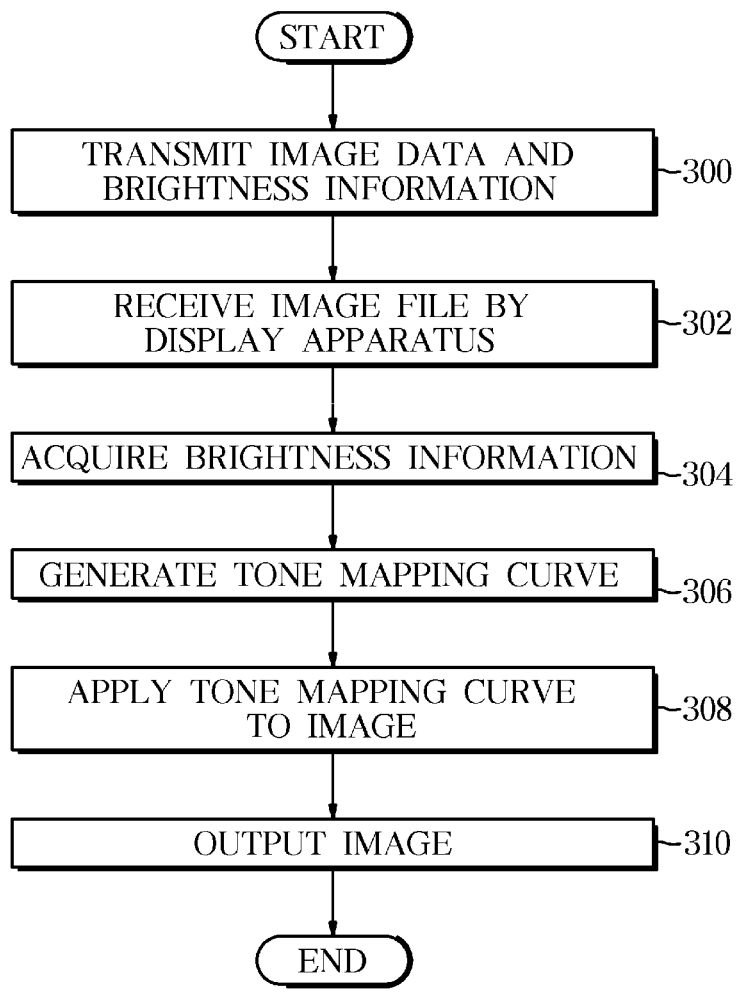
FIG. 18 is a flowchart illustrating a method for controlling a display apparatus according to an embodiment.

FIG. 18 is a flowchart illustrating a method for controlling a display apparatus according to an embodiment.

Referring to FIG. 18, image data and brightness information may be generated by the image producer terminal apparatus 9 or an image producer and then the generated image data and brightness information may be transmitted to the display apparatus in the form of image file.

For example, the display apparatus may directly receive image data and metadata from the image producer terminal apparatus 9 or the image producer through a server device or a repeater. Alternatively, the display apparatus may receive image data and metadata acquired from an optical disc or a separate image file through a signal transmission interface.

The brightness information may be acquired by using a histogram that is acquired by accumulating the greatest values (e.g., the maximum value among R value, G value and B value) of sub pixel values of each pixel of the image. For example, the brightness information may include percentile information defined based on the histogram.

The display apparatus may receive the image file (302) and acquire image data and metadata from the received image file (304).

When the image providing apparatus receives the image file, the image providing apparatus may acquire the image data and the metadata from the image file, and the acquired image data and the metadata may be transmitted to the display apparatus through a predetermined communication standard (e.g., HDMI or USB).

The display apparatus may generate a tone mapping curve based on the brightness information contained in the metadata (306). For example, the display apparatus may select any one point (knee point) based on at least two pieces of percentile information (e.g., 50% ile percentile information and 99% ile percentile information) contained in the brightness information, and calculate a coefficient of the function in the non-linear region based on the at least two pieces of percentile information, thereby generating a tone mapping curve. The display apparatus may generate a tone mapping curve based on the maximum brightness of the display (e.g., a display panel) mounted on the display apparatus.

The display apparatus may generate a tone mapping curve to be applied to the entire image or may generate a plurality of tone mapping curves to be separately applied to each cut or scene of the image.

The display apparatus may apply the generated tone mapping curve to the image data (308), and output the image data, to which the tone mapping curve is applied, to the outside (310).

Accordingly, the display apparatus may appropriately acquire and use the tone mapping curve for the image without receiving the tone mapping curve.

It is also possible that the above-described generation and/or application of the tone mapping curve is performed by an image providing apparatus connected to the display apparatus.

Figure 19:
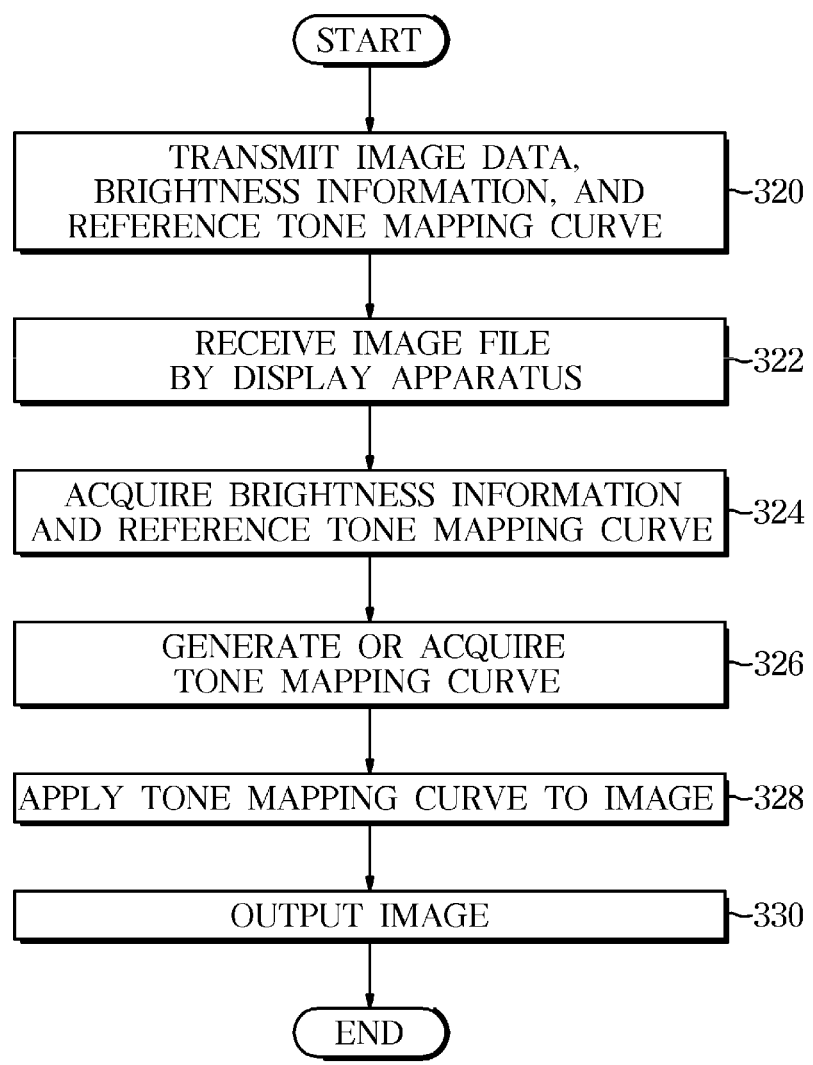
FIG. 19 is a flowchart illustrating a method for controlling a display apparatus according to another embodiment.

FIG. 19 is a flowchart illustrating a method for controlling a display apparatus according to another embodiment. A description of the same parts as those shown in FIG. 18 will be omitted.

Referring to FIG. 19, the image producer terminal apparatus 9 or the image producer may generate an image file and transmit the image file to the image providing apparatus and/or the display apparatus through a server device or a repeater, or an optical disc media or content in the form of file (320).

The image file may include image data and metadata, and the metadata may further include brightness information, the maximum brightness of the reference display apparatus, and the reference tone mapping curve.

The display apparatus may receive the image file or the image data and the metadata acquired by the image providing apparatus (322), and acquire the brightness information and the reference tone mapping curve from the metadata (324).

According to an embodiment, when the display apparatus receives metadata from the image producer terminal apparatus or the image producer, the display apparatus may directly acquire the brightness information and the reference tone mapping curve. Alternatively, when the display apparatus receives metadata from the image providing apparatus, the brightness information and the reference tone mapping curve may be acquired by the image providing apparatus.

The metadata may include the brightness information, information on the maximum brightness of the reference display apparatus, and the reference tone mapping curve.

The display apparatus may acquire or generate a tone mapping curve based on at least one of the brightness information, information on the maximum brightness of the reference display apparatus, and the reference tone mapping curve (326).

For example, the display apparatus may compare the maximum brightness (e.g., the maximum brightness of the reference display apparatus) corresponding to the reference tone mapping curve, with the maximum brightness of the display of the display apparatus. When the maximum brightness corresponding to the reference tone mapping curve is the same as the maximum brightness of the display of the display apparatus based on a result of comparison, the display apparatus may select the received reference tone mapping curve as a tone mapping curve to be applied to the image data.

When the maximum brightness corresponding to the reference tone mapping curve is different from the maximum brightness of the display, the display apparatus may generate and acquire a tone mapping curve by using at least one of the brightness information and the reference tone mapping curve.

For example, when the maximum brightness of the display is greater than the maximum brightness of the reference display apparatus, the display apparatus may place a knee point of the reference tone mapping curve relatively far from the origin. In other words, the display apparatus may select a knee point of a new tone mapping curve by increasing a distance between the knee point of the reference tone mapping curve and the origin. Sequentially, the display apparatus may calculate a coefficient using the coefficient of the reference tone mapping curve and/or the brightness information, and then calculate a function of the non-linear region based on the calculated coefficient, thereby generating a tone mapping curve by using the selected knee point and the calculated function of the non-linear region.

On the other hand, when the maximum brightness of the display is less than the maximum brightness corresponding to the reference tone mapping curve, the display apparatus place a knee point of the reference tone mapping curve relatively close to the origin. In other words, the display apparatus may select a knee point of a new tone mapping curve by reducing a distance between the knee point of the reference tone mapping curve and the origin. Sequentially, the display apparatus may calculate a coefficient using the coefficient of the reference tone mapping curve and/or the brightness information, and then calculate a function of the non-linear region based on the calculated coefficient, thereby generating a tone mapping curve by using the selected knee point and the calculated function of the non-linear region.

Accordingly, it may be possible to appropriately select or generate a tone mapping curve to be applied to the image data.

The display apparatus may generate a tone mapping curve to be applied to the entire image or may generate a plurality of tone mapping curves to be separately applied to each cut or scene of the image.

The display apparatus may apply the generated tone mapping curve to image data (328).

The image data to which the tone mapping curve is applied may be visually output to the outside via the display (330).

As is apparent from the above description, according to the proposed display apparatus, method for controlling the same, and image providing apparatus, it may be possible to directly generate a tone mapping function to be applied to an image, which is to be displayed on the display apparatus and/or the image providing apparatus, without receiving the function from the outside.

It may be possible to generate a tone mapping curve, which is appropriate for an image to be displayed with brightness value of the image that is provided by the display apparatus and/or the image providing apparatus, and/or it may be possible to receive brightness value of the received image and the reference tone mapping curve and then generate a tone mapping curve, which is appropriate for an image to be displayed, based on the brightness value of the received image and the reference tone mapping curve.

Since it is not required to add the tone mapping curve to the metadata of the image and then transmit the metadata to the display apparatus and/or the image providing apparatus, the display apparatus and/or the image providing apparatus may acquire a tone mapping curve, which is appropriate for an image to be displayed despite of using a communication standard in which the size of transmittable metadata is relatively small.

Since it is not required to transmit a tone mapping curve corresponding to each image or each part of image (e.g., scene) to the display apparatus and/or the image providing apparatus to implement a dynamic high dynamic range, it may be possible to obtain the economic effect.

A method for controlling a display apparatus according the above-described embodiment may be implemented in the form of a program executed by a variety of computer implementations. The program may include program instructions, data files, and data structures as itself or a combination therewith. The program may be designed or manufactured by using higher level code executed by the computer by using an interpreter, as well as by using a machine code that is produced by a compiler. In addition, the program may be particularly designed to implement the control method of the above mentioned method for controlling a display apparatus or may be implemented by using various functions or definition that are well-known and available to a group of ordinary skill in the computer software field.

Programs for implementing method for controlling a display apparatus may be recorded on a recording medium readable by a computer. The recording medium readable by a computer may include various types of hardware devices capable of storing a particular program executed in response to a call from a computer, e.g. magnetic disk storage media such as a hard disk or a floppy disk, optical media such as a magnetic tape, a compact disc (CD) or a DVD, magneto-optical media such as a floptical disk, and semiconductor memory devices such as ROM, RAM, or flash memory.

Hereinbefore a variety of embodiments of the display apparatus, method for controlling the same, and image providing apparatus are described, but is not limited thereto. A variety of embodiments which is implementable by those skilled in the art by correcting and modifying based on the above mentioned embodiment may correspond to the above mentioned display apparatus, method for controlling the same, and image providing apparatus. For example, when the above-mentioned techniques is executed in a different order from the above-mentioned method, and/or the above-mentioned components such as system, structure, device and circuit is coupled or combined in a manner different from the above-mentioned method or is replaced or substituted by other components or equivalents, the same or the similar result as the above-mentioned display apparatus, method for controlling the same, and image providing apparatus may be achieved and those may correspond to an example of the above-mentioned display apparatus, method for controlling the same, and image providing apparatus.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a processor configured to generate a tone mapping curve by using brightness information, received by the display apparatus, of an image, and a reference tone mapping curve, received by the display apparatus, and to apply the tone mapping curve to image data, received by the display apparatus, of the image; and
   a display configured to display the image based on the image data having the tone mapping curve applied thereto, wherein
   the tone mapping curve includes a linear region extending from an origin of the tone mapping curve to a knee point of the tone mapping curve and having a slope set to a ratio of a maximum brightness of the image to a maximum brightness of the display and maintained at the ratio for the entire linear region, and a continuously non-linear region extending from the knee point to a point of the tone mapping curve corresponding to the maximum brightness of the display, to thereby map a brightness range of the image to a brightness range of the display,
   the processor is configured to generate the tone mapping curve by increasing a distance between the origin of the tone mapping curve and the knee point of the tone mapping curve when the maximum brightness of the display is greater than a maximum brightness corresponding to the reference tone mapping curve, as compared to a case in which the maximum brightness of the display is less than the maximum brightness corresponding to the reference tone mapping curve, and the processor is configured to generate the tone mapping curve by reducing a distance between the origin and the knee point when the maximum brightness of the display is less than the maximum brightness corresponding to the reference tone mapping curve, as compared to the case in which the maximum brightness of the display is greater than the maximum brightness corresponding to the reference tone mapping curve.

2. The display apparatus of claim 1, wherein
the brightness information of the image comprises percentile information of a brightness distribution that is acquired by accumulating a maximum brightness value of each pixel of the image, and
the maximum brightness value is the largest value among a brightness value of a R sub pixel, a brightness value of a G sub pixel, and a brightness value of a B sub pixel.

3. The display apparatus of claim 1, wherein
the processor is configured to select the reference tone mapping curve as the tone mapping curve when the maximum brightness of the display is the same as the maximum brightness corresponding to the reference tone mapping curve, and
the processor is configured to generate the tone mapping curve by using at least one of the brightness information and the reference tone mapping curve, when the maximum brightness of the display is different from the maximum brightness corresponding to the reference tone mapping curve.

4. The display apparatus of claim 1, wherein
the display apparatus is configured to receive the image data and the brightness information by using High Definition Multimedia Interface (HDMI) standard.

5. The display apparatus of claim 1, wherein the non-linear region is representable by a quadratic function.

6. A method comprising:
by a display apparatus,
receiving image data of an image, and-brightness information of the image, and a reference tone mapping curve;
generating a tone mapping curve by using the brightness information and the reference tone mapping curve;
applying the tone mapping curve to the image data; and
displaying, on a display, the image based on the image data having the tone mapping curve applied thereto, wherein
the tone mapping curve includes a linear region extending from an origin of the tone mapping curve to a knee point of the tone mapping curve and having a slope set to a ratio of a maximum brightness of the image to a maximum brightness of the display and maintained at the ratio for the entire linear region, and a continuously non-linear region extending from the knee point to a point of the tone mapping curve corresponding to the maximum brightness of the display, to thereby map a brightness range of the image to a brightness range of the display,
the generating the tone mapping curve generates the tone mapping curve by increasing a distance between the origin of the tone mapping curve and the knee point of the tone mapping curve when the maximum brightness of the display is greater than a maximum brightness corresponding to the reference tone mapping curve, as compared to a case in which the maximum brightness of the display is less than the maximum brightness corresponding to the reference tone mapping curve, and
the generating the tone mapping curve generates the tone mapping curve by reducing a distance between the origin and the knee point when the maximum brightness of the display is less than the maximum brightness corresponding to the reference tone mapping curve, as compared to the case in which the maximum brightness of the display is greater than the maximum brightness corresponding to the reference tone mapping curve.

7. The method of claim 6, wherein
the brightness information of the image comprises percentile information of a brightness distribution that is acquired by accumulating a maximum brightness value of each pixel of the image, and
the maximum brightness value is the largest value among a brightness value of a R sub pixel, a brightness value of a G sub pixel, and a brightness value of a B sub pixel.

8. The method of claim 6, wherein
the generating comprises at least one of
selecting the reference tone mapping curve as the tone mapping curve, when the maximum brightness of the display is the same as the maximum brightness corresponding to the reference tone mapping curve, and
generating the tone mapping curve by using at least one of the brightness information and the reference tone mapping curve, when the maximum brightness of the display is different from the maximum brightness corresponding to the reference tone mapping curve.

9. The method of claim 6, wherein
the receiving comprises receiving the image and the brightness information by using High Definition Multimedia Interface (HDMI) standard.

10. The method of claim 6, wherein the non-linear region is representable by a quadratic function.

* * * * *